Sept. 14, 1965   D. G. COLEMAN   3,205,793
MACHINE FOR SETTING-UP EGG CARTONS
Filed Nov. 8, 1962   11 Sheets-Sheet 1

INVENTOR.
Donald G. Coleman
BY Roy A. Plant
ATTORNEY

INVENTOR.
Donald G. Coleman
BY Roy A. Plant
ATTORNEY

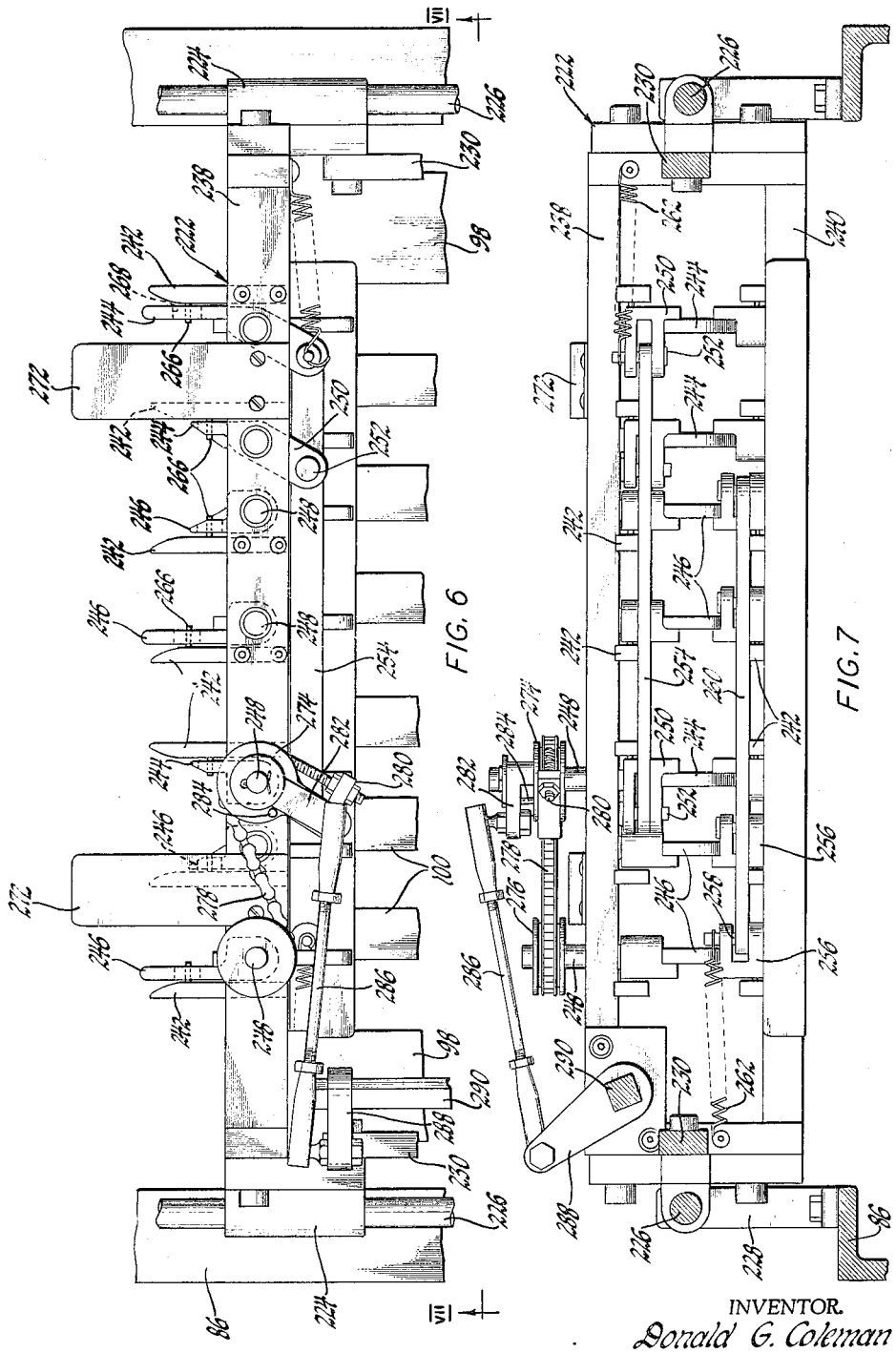

Sept. 14, 1965          D. G. COLEMAN          3,205,793
MACHINE FOR SETTING-UP EGG CARTONS Filed Nov. 8, 1962          11 Sheets-Sheet 8

INVENTOR
Donald G. Coleman
BY Roy A. Plant
ATTORNEY

Sept. 14, 1965   D. G. COLEMAN   3,205,793
MACHINE FOR SETTING-UP EGG CARTONS

Filed Nov. 8, 1962   11 Sheets-Sheet 11

INVENTOR
Donald G. Coleman

BY   Roy A. Plant

ATTORNEY

United States Patent Office 3,205,793
Patented Sept. 14, 1965

3,205,793
MACHINE FOR SETTING-UP EGG CARTONS
Donald G. Coleman, Battle Creek, Mich., assignor to Michigan Carton Co., Battle Creek, Mich., a corporation of Michigan
Filed Nov. 8, 1962, Ser. No. 236,194
18 Claims. (Cl. 93—37)

This invention relates to an apparatus for setting-up or erecting paperboard cartons and, in particular, relates to a method and apparatus for setting-up or erecting a collapsed paperboard carton blank into a cellular carton for receiving and storing eggs.

It has heretofore been proposed to set-up or erect cellular cartons, such as egg cartons, by providing an apparatus comprising several set-up instrumentalities for successively acting upon a plurality of collapsed paperboard carton blanks which are supplied one at a time from a stack thereof contained in a supply magazine. With specific reference to the set-up of cartons for receiving and storing a plurality of eggs therein, such collapsed carton blanks are characterized by a connected series of panel members adapted to be erected into top, side and bottom wall forming members of the finally set-up carton, and further includes cross partition forming panel members foldable out of the plane of the top wall forming member into interlocking engagement with the bottom wall forming member to form the finally set-up or erected carton and the cell structure thereof for receipt of the eggs. The set-up apparatus of the prior art has typically included means for feeding a collapsed carton blank from the aforementioned supply magazine one at a time to a set-up zone in which stop means are provided for arresting the feeding movement of the carton, and additional means are provided for at least partially expanding the carton blanks and disposing the top wall forming member thereof in engagement with a reciprocable set-up head equipped with a plurality of pivoted folding plates or leaves adapted to engage and fold the cross partition forming panel members out of the plane of the top wall forming member for subsequent interlocking engagement with the bottom wall forming member of the carton blank which is tucked into engagement therewith by suitable tucking means. While such prior apparatus and method have been employed with some success, they have presented certain problems which seriously detract from the efficiency of the carton set-up or erecting operation, and frequently malfunction in properly erecting egg cartons thereby resulting in considerable waste in paperboard carton blanks.

For example, in one known apparatus of this type, a plurality of pick-up cleats or fingers are mounted on the leading or feeding edge of a feed mechanism so as to engage in corresonding pick-up openings in the lowermost collapsed carton blank of a stack thereof contained in the aforementioned supply magazine so as to feed such lowermost carton blank from the stack into a set-up zone on the apparatus. In this regard, the magazine includes an elongate opening and cooperable rigid metering bars spaced a certain distance from the floor of the magazine and intended to insure that only one or the aforementioned lowermost carton blank is fed or metered from the magazine at any one time by the aforementioned feed mechanism. However, due to the fact that the thicknesses of successive carton blanks may vary at least to a slight extent, the feed mechanism may attempt to feed a carton blank which is too thick for the aforementioned opening or a pair or more of thinner carton blanks, thereby resulting in malfunctioning of the feed mechanism.

In addition, the aforementioned stop means of prior art apparatus and method for arresting the feeding movement of the carton blank in the set-up zone has typically comprised oscillatable stop fingers operated in timed relation to the rest of the drive instrumentalities of the apparatus so as to be disposed at the proper time in the path of feeding movement of the carton blank to arrest feeding movement thereof and positively stop the carton in position. As will be apparent, the drive mechanism for such stop or arresting fingers must not only be adjusted so as to be in time with other drive mechanisms for other instrumentalities of the apparatus but also must be adjusted so as to be located in the proper position to arrest a carton blank of a particular length. Consequently, on those occasions when it is desired to feed and subsequently erect carton blanks having a length between their leading and trailing edges greater than the length of carton blanks previously erected by such an apparatus, it has been necessary to adjust the position of the aforementioned stop or arresting fingers and the drive mechanism therefor to accommodate the cartons having the different lengths aforementioned. As a consequence, considerable "down" time may result during adjustment of the stop or arresting fingers and its drive mechanism, thereby detracting from the overall efficiency of the apparatus.

Furthermore, once a given carton blank has been fed as aforementioned to a set-up zone, means including a plurality of expanding fingers have been provided for entering one side wall forming member of the collapsed carton so as to engage the opposite overlying side wall forming member thereof to at least partially expand the carton for cooperation with a set-up head. During such expanding operation, it has been possible, particularly when the fingers engage the side wall forming panel member of the carton adjacent the leading or feeding edge of the carton blank, for such latter edge to be lifted from the apparatus in the set-up zone thereby contributing to misalignment of the carton blank for subsequent cooperation with the aforementioned set-up head. As a result, there is an additional possibility for malfunctioning of the apparatus.

In addition, the set-up head of such a prior apparatus has been provided with a plurality of pivoted folding plates or leaves adapted to engage the top wall forming member of the carton blank in the set-up zone and being operable to fold the cross partition forming panel members out of the plane thereof toward the bottom wall forming member for subsequent interlocking engagement with the latter in response to operation of tucking means engageable with such bottom wall forming member. During such tucking operation, it has been possible for the carton blank to slip from the set-up head to a position preventing obtaining at least complete interlocking engagement as required, thereby resulting in an incompletely erected carton.

By way of further example, one of the more serious problems presented by apparatus of the type in question and heretofore known resides in operation of the aforementioned set-up head and the pivotal folding plates or leaves carried thereby for folding the cross partition forming panel members of the carton blank into position for interlocking engagement with the bottom wall forming member of the carton upon final set-up. More specifically, one type of known apparatus, the set-up head has been mounted for oscillatory movement between the supply magazine containing the stack of collapsed carton blanks and a set-up zone in which the set-up operation occurs, and the folding plates or leaves have been relatively impositively actuated; that is, as a function of the oscillatory movement of the set-up head itself and without any direct or positive relation to the position of the carton blank being set-up for other set-up instrumentalities of the apparatus. Thus, it frequently happens that the folding plates are at least partially operated and pivoted before they even engage the cross partition forming panel members of a partially erected carton, thereby resulting in the folding plates or leaves attempting to pierce through the cross partition forming members rather than folding them into position for operative interlocking engagement with the bottom wall forming member of the carton blank.

In addition, as such prior known apparatus are adapted to set-up or erect deeper and deeper cartons, that is, erected cartons in which the individual cells thereof are relatively deeper and deeper, it is necessary for the aforementioned tucking fingers which cooperate with the bottom wall forming panel member of the carton blank to tuck the latter into interlocking engagement with the cross partition forming panel members aforementioned to form such cells to have a relatively greater range of swinging movement to accomplish this tucking operation. In other words, the deeper the cell structure for any given erected carton, such tucking fingers, as will be readily apparent to those acquainted with this art, must swing through relatively greater arcs to accomplish interlocking engagement of the bottom wall forming member with the cross partition forming panel members of the carton blank. While it might appear that this problem merely involves adapting the tucking fingers for swinging movement through a greater arc than heretofore required in tucking and erecting shallower cartion blanks, increase in the swinging arc of such tucking fingers presents serious problems of clearance with respect to other movable instrumentalities of the apparatus. In the final analysis, due to considerations of clearance and obstruction of movement of the tucking fingers by other set up instrumentalities of the apparatus, it is not as a practical matter too feasible to increase the swinging arc of the tucking fingers to accomplish set-up of cartons having deeper and deeper cells therein.

Therefore, the objects and features of the present invention include the provision of an improved set-up apparatus and method by which successive collapsed paperboard carton blanks may be fed one at a time from a magazine and set-up quite rapidly and efficiently into erected cellular cartons of the type particularly adapted to receive eggs, while avoiding one or more of the problems discussed above as well as others.

It is yet another object and feature of the invention to provide and improve carton set-up apparatus and method including means in association with the supply magazine for a stack of collapsed carton blanks for feeding and metering the lowermost carton blank in the stack thereof to a set-up zone on the apparatus, the metering means functioning to compensate for variations of even a slight nature in the thicknesses of successive carton blanks being fed.

It is yet another object and feature of this invention to provide an improved carton set-up apparatus and method of the type aforementioned comprising a supporting frame, a supply magazine including floor means therefor secured to one end of the supporting frame for receiving a stack of carton blanks, a plurality of spaced adjustably fixed metering bars on the magazine and respectively spaced a predetermined distance opposite the floor means of the magazine, a plurality of spaced yieldable metering springs mounted on the floor means of the magazine opposite respective ones of the aforementioned metering bars to meter successive carton blanks from the magazine, and a feed mechanism including a feed plate movable from beneath the floor means of the magazine to feed a lowermost carton blank in a stack thereof in said supply magazine from the latter through the aforementioned metering means into a set-up zone on the supporting frame, thereby insuring metering of only the lowermost carton blank of the stack thereof at one time irrespective of variation in thickness of such carton blank.

It is yet another object and feature of this invention to provide a method and apparatus of the type aforementioned further characterized by hold-down finger means disposable in the path of a carton blank being fed by the aforementioned feed mechanism and being engageable with the leading edge of such a carton blank to hold the latter down on the supporting frame of the apparatus in the aforementioned set-up zone at least during a subsequent operation of partially expanding the carton blank for cooperation with a set-up head in such set-up zone, and yieldable support means for the aforementioned hold-down finger means permitting yieldable movement of the latter away from the set-up zone in the event of feed of a carton blank into the set-up zone beyond a predetermined extent, thereby adapting such an apparatus to accommodate carton blanks of differing lengths and compensating for any inadvertent variation in the feeding operation of the aforementioned feed mechanism.

It is yet another object and feature of this invention to provide a method and apparatus for setting-up a collapsed paperboard carton blank into an erected cellular carton of the type adapted to receive a plurality of eggs nested therein characterized by means for feeding carton blanks one at a time to a set-up zone, means for engaging the top wall forming member of the carton blank with a reciprocable set-up head provided with a plurality of pivotal folding plates or leaves for folding the cross partition forming members of the carton blank into position for operative interlocking engagement with the bottom wall forming member of the carton which may be interlocked subsequently therewith, and drive means for the reciprocable set-up head adapted to hold the latter substantially stationary in the set-up zone of the apparatus during operation of the folding plates or leaves to insure that the latter properly fold the cross partition forming members of the carton and do not attempt to pierce them.

It is yet another object and feature of this invention to provide a method and apparatus as aforedescribed further characterized by means for operating the folding plates or leaves in direct relation to the position of the aforementioned set-up head, whereby the folding plates or leaves are not operated until the set-up head arrives at a substantially complete stop in the set-up zone and the cross partition forming members of the carton blank are engaged with the set-up head.

It is yet another object and feature of this invention to provide a method and apparatus for setting-up a collapsed paperboard carton blank into an erected cellular carton of the type adapted to receive a plurality of eggs nested therein comprising a supporting frame including a set-up zone, a set-up head mounted for movement along the supporting frame to and from the aforementioned set-up zone, a plurality of pivotally mounted folding plates or leaves on the set-up head for engagement with and folding the cross partition forming members in the set-up zone, drive means for moving the set-up head to and from the set-up zone and being operable to hold the set-up head substantially stationary in a first set-up position in the set-up zone during operation of the folding plates to fold the cross partition forming members of the carton blank and thereafter being subsequently operable after a predetermined time interval to move the set-up head to a final set-up position in the set-up zone, means for disposing a carton blank in the set-up zone with the cross partition forming members thereof in engagement with the set-up head in the first set-up position thereof, swingable tucking finger means engageable with a bottom wall forming member of the carton blank, and drive means to swing the tucking finger means toward the set-up head in the first set-up position thereof and being subsequently operable to hold such tucking means substantially stationary during movement of the set-up head from its first set-up position to the second set-up position thereof to move the folded cross partition forming panel members into interlocking engagement with the bottom wall forming member of the fully erected carton, thereby resulting in an apparatus in which the aforementioned tucking finger means are adapted to swing through a limited arc irrespective of the depth of the cells of a given carton being erected, and cartons having deeper cells being formed and the cross partition forming panel members thereof being interlockingly engaged with the bottom wall forming member thereof in response to two step reciprocation of the set-up head to complete final set-up of the carton as aforedescribed.

It is yet another object and feature of this invention to provide a method and apparatus as aforedescribed wherein the aforementioned set-up head includes a plurality of stop means fixed thereto and cooperable with respective ones of the aforementioned folding plates or leaves upon folding the cross partition forming members of the carton to engage and positively hold such cross partition forming members during the final tucking or set-up operation, thereby insuring that such cross partition forming panel members cannot slip or otherwise be dislodged from the set-up head.

Still further objects, features and advantages of the invention will appear as the description proceeds.

To the accomplishment of the foregoing and related ends, the invention, then, consists of the steps and means hereinafter fully described and particularly pointed out in the claims, the annexed drawings and the following description setting forth in detail certain means and modes of carrying out the invention, such disclosed means and modes illustrating, however, but several of the various ways in which the principle of the invention may be used.

In the annexed drawings:

FIGURE 1 is a side elevation of an egg carton set-up apparatus constructed in accordance with a preferred embodiment of the invention and illustrating the positions of various set-up instrumentalities thereof during the final carton set-up operation, and particularly illustrating the set-up head of the apparatus disposed in one extreme or final set-up position in a set-up zone of the apparatus where the final carton set-up or erection takes place;

FIGURE 6 is an enlarged fragmentary view of FIGURE 2 illustrating certain details of the set-up head, and showing the folding plates or leaves thereof in the fully open position they assume upon completion of a folding operation on a carton blank;

FIGURE 7 is a view taken on line VII—VII of FIGURE 6;

Figure 5:
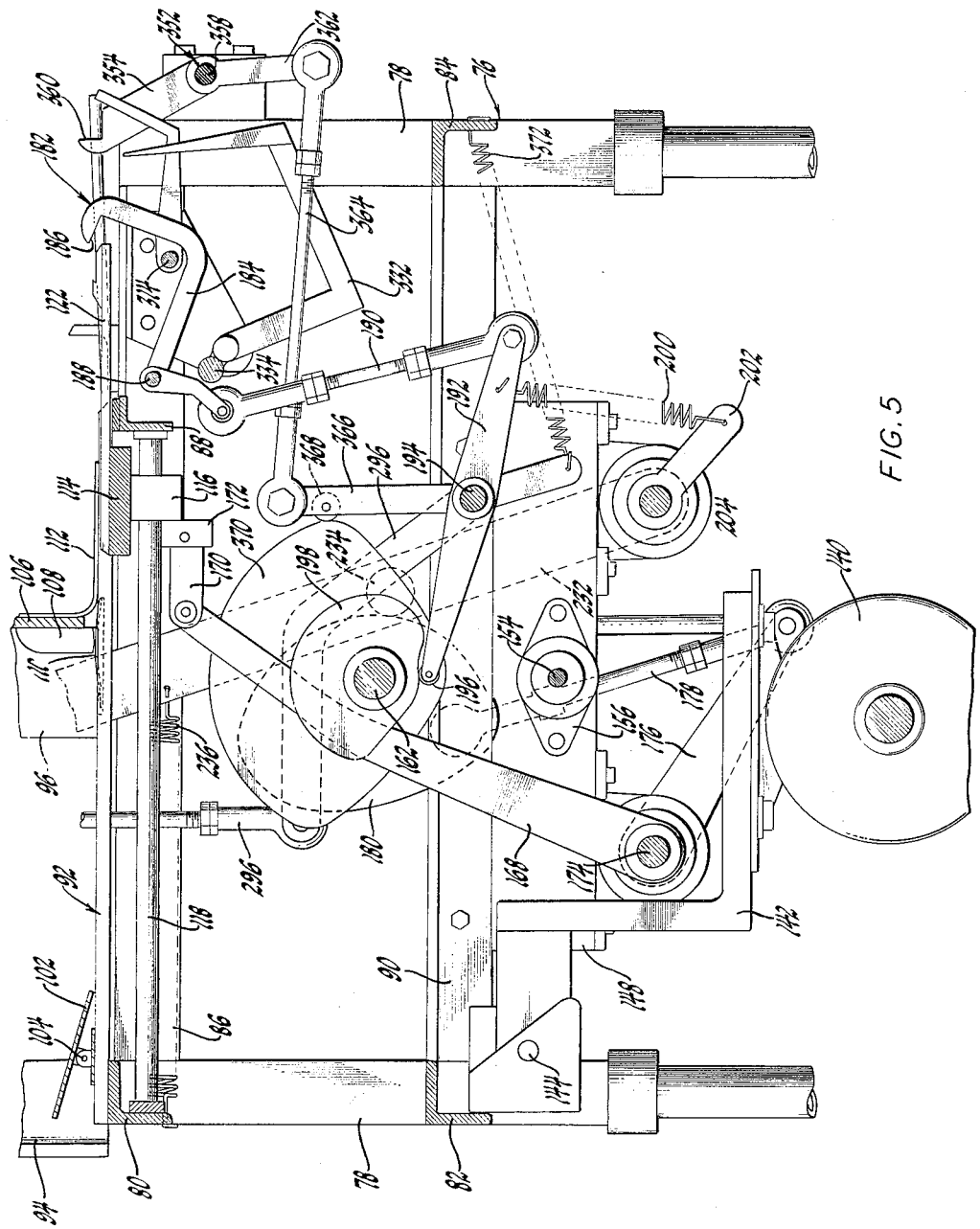
FIGURE 5 is a sectional view taken on line V—V of FIGURE 2 with certain parts broken away, eliminated or shown fragmentarily so as not to obscure certain details of the invention.
Figure 8:
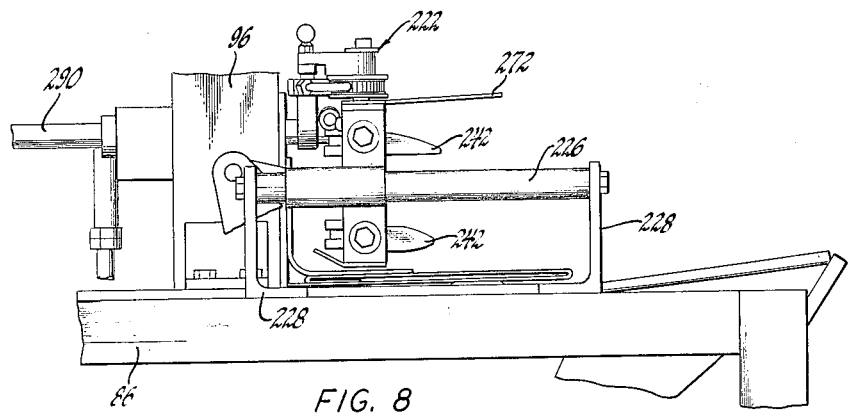
FIGURE 8 is a fragmentary side elevational view of the apparatus of FIGURE 1, but showing various set-up instrumentalities thereof in the positions they assume during feeding of a carton blank to a set-up zone of the apparatus and with the set-up head in its one extreme position adjacent the supply magazine containing the carton blanks.
Figure 9:
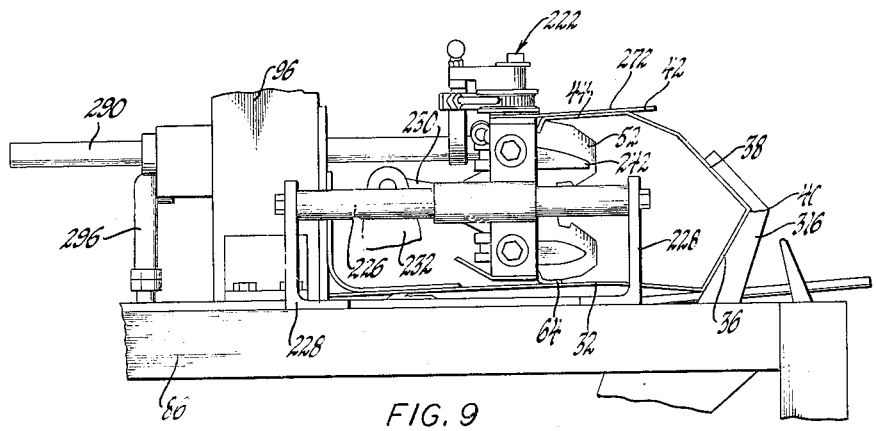
FIGURE 9 is a view corresponding generally to FIGURE 8, but showing the positions of the various set-up instrumentalities of the apparatus upon feed of a carton blank to the set-up head in a stationary first set-up position in a set-up zone and after operation of the folding plates or leaves.
Figure 11:
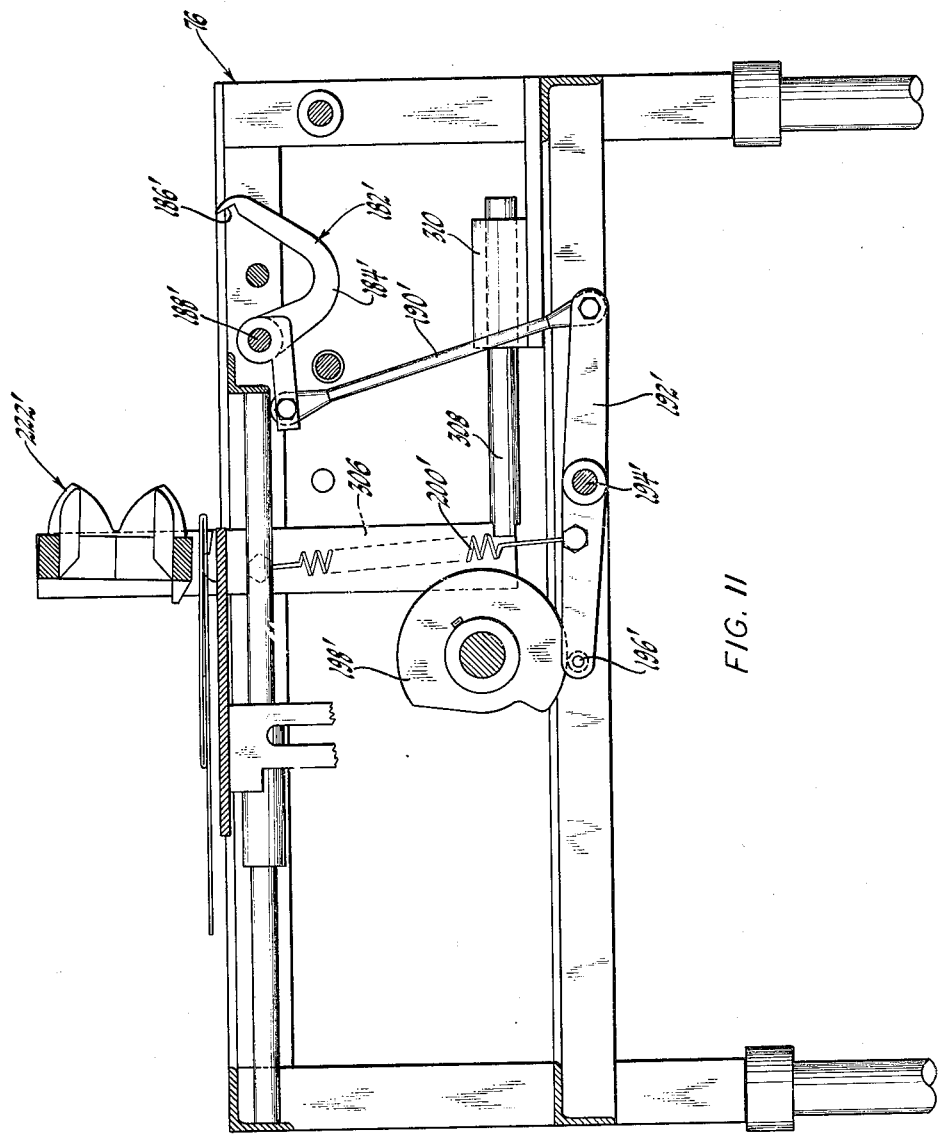
Figure 12:
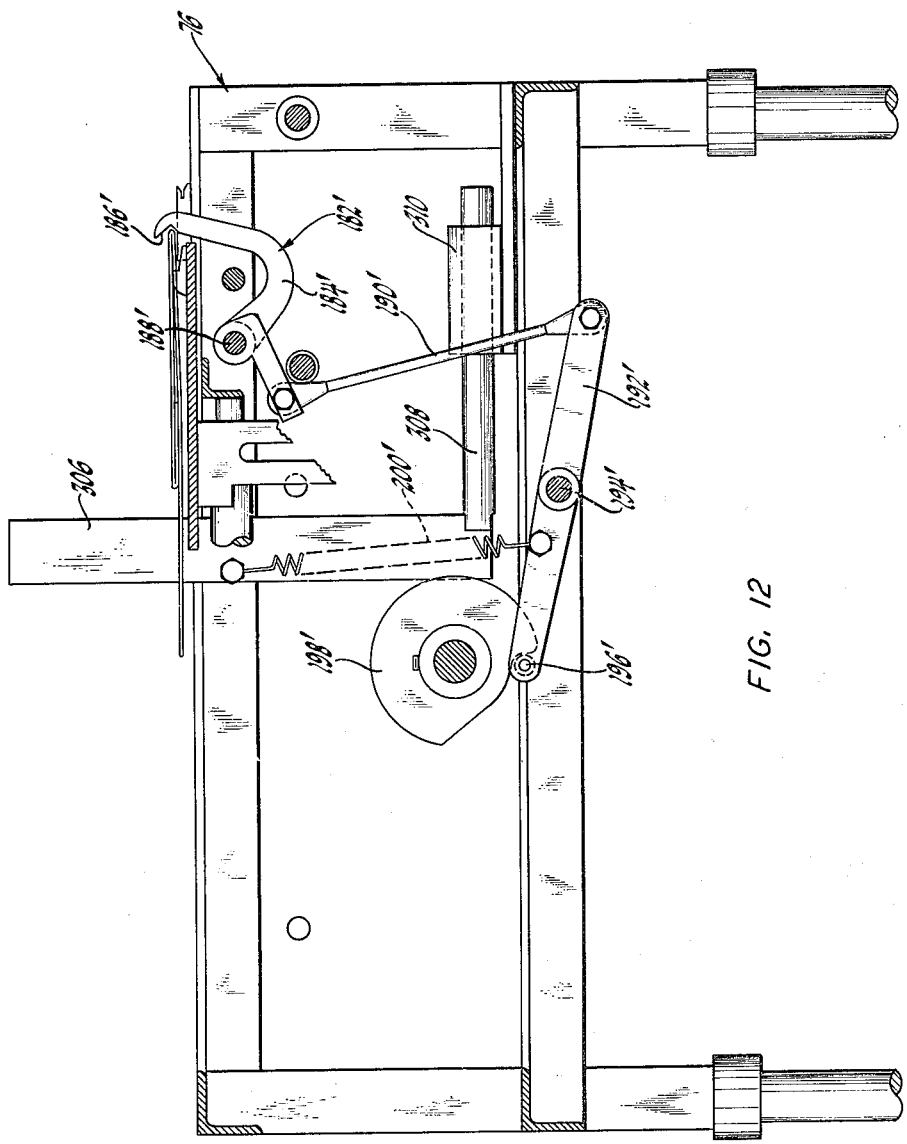
Figure 13:
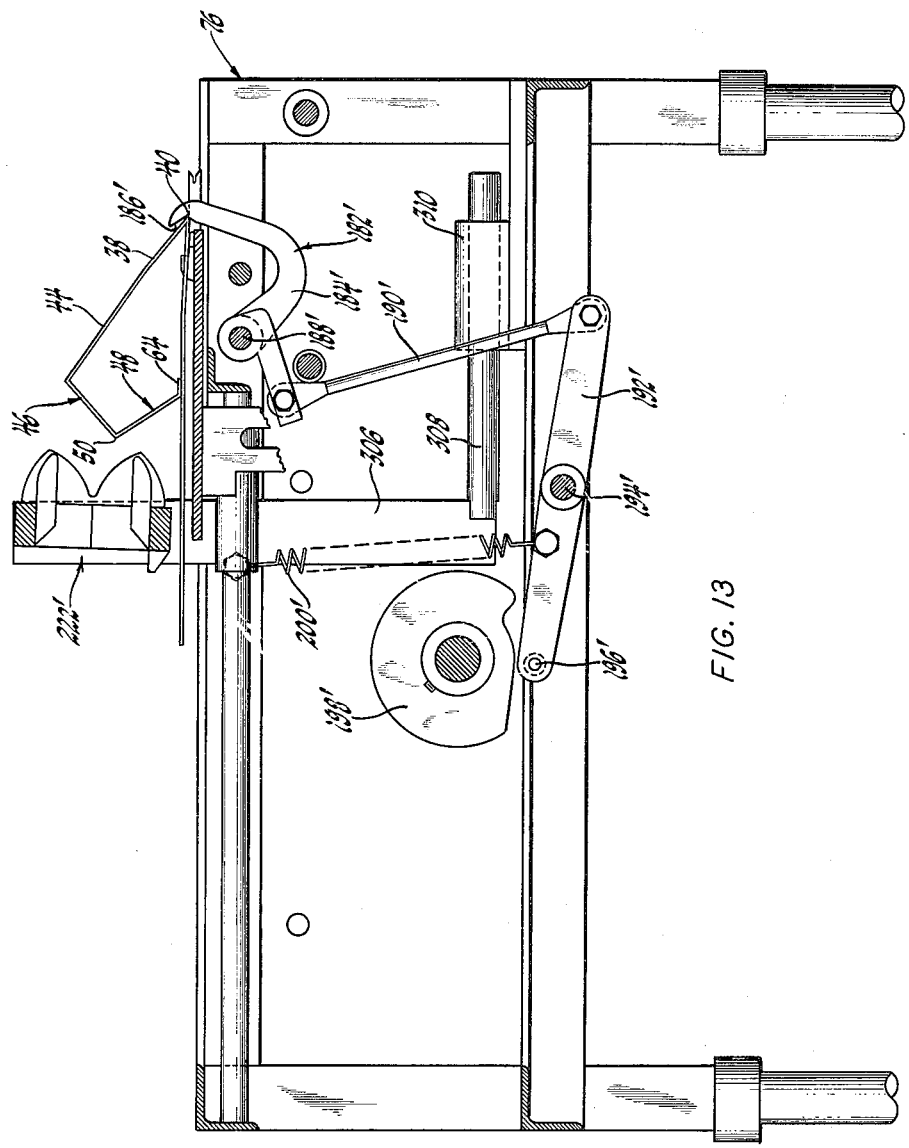
Figure 14:
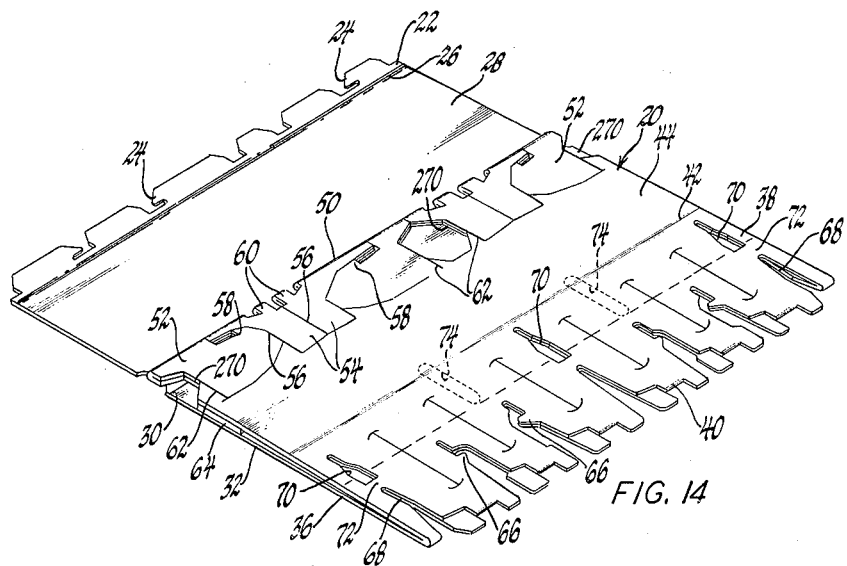
Figure 15:
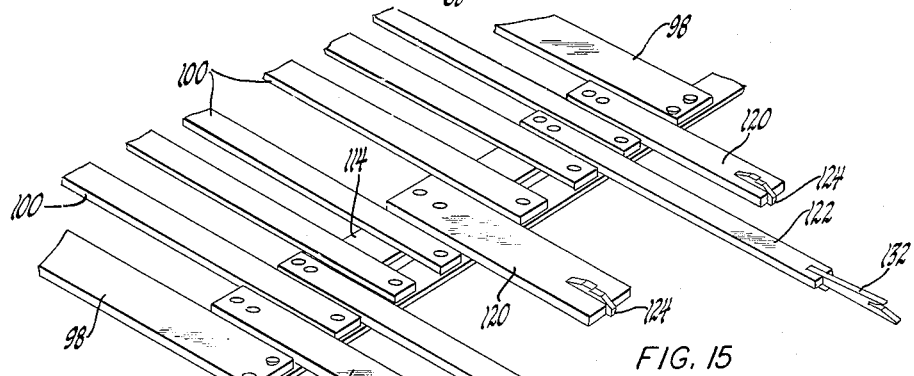
Figure 16:
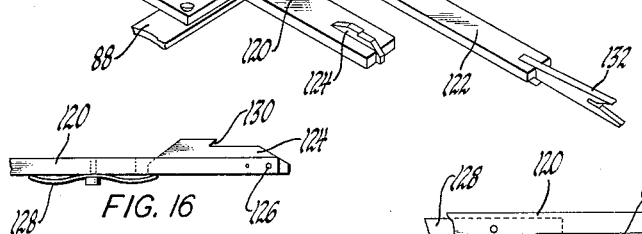
Figure 17:
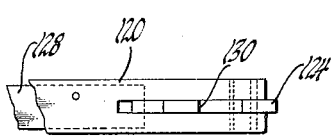
Figure 18:
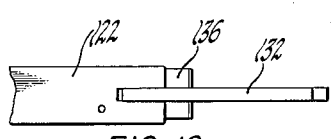
Figure 19:
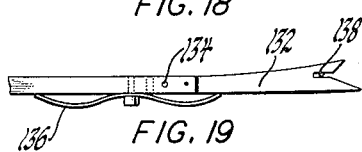

FIGURE 11 is a sectional view corresponding generally to FIGURE 5 with certain parts broken away, eliminated or shown fragmentarily so as not to obscure certain details of the apparatus, and illustrates another preferred embodiment of the apparatus involving a modification in the set-up head and hold-down finger means thereof, the set-up and hold-down finger means being shown in the positions they assume during initial feeding of a carton blank to the set-up zone, which positions are assumed prior to that illustrated in FIGURE 8;

FIGURE 12 is a view corresponding generally to FIGURE 11 but illustrating the position of various instrumentalities of the apparatus after feeding of a carton blank to the set-up zone and the leading edge thereof engaged by the hold-down finger means, positions which are assumed after the positions illustrated in FIGURE 8 and before those of FIGURE 9;

FIGURE 13 is a view corresponding generally to FIGURES 11 and 12, but illustrating the positions of certain instrumentalities of the apparatus during partial expansion of the carton blank by expanding fingers, not shown, and prior to movement of the set-up head from its position adjacent the supply magazine as illustrated in FIGURE 8;

FIGURE 14 is a perspective view of a collapsed paperboard carton blank adapted to be set-up into an erected carton by the apparatus and method of this invention;

FIGURE 15 is a fragmentary perspective view of the floor means of the supply magazine and the feed plate of the apparatus which feeds collapsed carton blanks one at a time to the set-up instrumentalities aforementioned;

FIGURE 16 is a fragmentary side elevational view of the feed plate of FIGURE 15 illustrating one of the pick-up fingers or cleats mounted thereon;

FIGURE 17 is a top plan view of the pick-up finger or cleat illustrated in FIGURE 16;

FIGURE 18 is a fragmentary top plan view of the feed plate of FIGURE 15 illustrating one of the ejecting cleats or fingers mounted thereon; and FIGURE 19 is a side elevational view of the ejecting cleat or finger of FIGURE 18.

Referring now to the drawings, and particularly FIGURE 14 thereof, the numeral 20 generally designates the type of collapsed partially folded paperboard carton blank adapted to be manipulated and set-up into an erected carton for subsequent use. As is well known in the art, a carton blank of this type is formed from a unitary paperboard blank which is cut, creased, folded, and glued so as to result in the collapsed carton blank illustrated in FIGURE 14, which also illustrates the condition of the carton blank as it is supplied to the user thereof.

Figure 10:
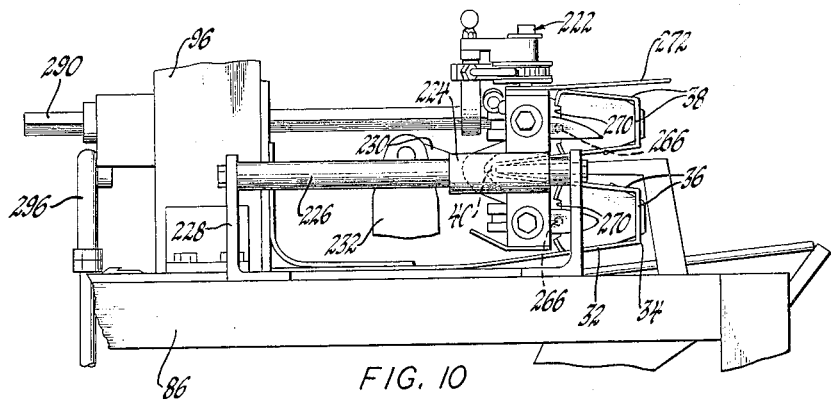
FIGURE 10 is a view corresponding generally to FIGURES 8 and 9, but showing the positions of the various set-up instrumentalities of the apparatus during final set-up or erection of the carton blank and with the set-up head in its other extreme or final set-up position in the set-up zone, such showing corresponding to that of FIGURE 1.

More specifically, and referring also to FIGURES 9, 10 and 13, the carton blank 20 comprises a relatively narrow locking panel or strip 22 extending across one end thereof, and including a plurality of spaced locking hooks 24. The locking panel or strip is bendable along a fold line 26 with respect to a cover forming panel member 28 adapted to close the top of an erected carton upon engaging the locking hooks in one edge thereof. The cover forming panel member is bendable along the fold line 30 with respect to one side wall forming panel member 32 which is bendable along a fold line 34 with respect to the bottom wall forming panel member 36 which is, in turn, bendable with respect to another substantially duplicate bottom wall forming panel member 38 along the medial fold line 40. The bottom wall forming panel member 38 is, in turn, bendable along a fold line 42 with respect to the other side wall forming panel member 44 which is substantially a duplicate of the side wall forming panel member 32. A pair of top wall forming panel members are indicated generally at 46 and 48, respectively, as illustrated in FIGURE 13, and are joined together by the medial fold line 50. Referring in particular to FIGURE 14, each top wall forming panel member includes a plurality of interconnected cross partition forming panel members 52 and 54 which are separable along the score lines 56 by a folding means to be described hereinafter, and foldable out of the respective planes of the top wall forming panel members 46 and 48 inwardly of a partially erected carton for engagement with the bottom wall forming panel members 36 and 38. In this regard, each of the cross partition forming panel members 52, of which there are three in number although the number may vary, includes hook members 58 for locking cooperation with portions of the bottom wall forming panel members 36 and 38, while each of the cross partition forming panel members 54, of which there are four although the number may vary, includes bridging portions 60 along the medial fold line 50 for locking cooperation with other portions of the bottom forming panel members as will be described.

One end of each of the cross partition forming panel members 52 and 54 is swingably connected to one edge of the side wall forming panel member 44 by means of small tabs jointed on fold lines indicated at 62, while the other ends of the cross partition forming panel members are similarly swingably connected to an elongate terminal glue strip 64 attached by glue or otherwise to the inner surface of the side wall forming panel member 32. A row of spaced elongate openings including hook members 66, four such openings being shown corresponding to the number of cross partition forming panel members 54, extend from and along the medial fold line 40 separating the bottom wall forming panel members 36 and 38, and are adapted to be tucked inwardly of a carton during erection or set-up thereof for engagement of the respective hook members with the respective bridging portions 60 of the cross partition forming panel members 54. Another row of spaced elongate openings 68 each including a spaced pick-up opening 70 defining therebetween a bridge portion 72, there being three such openings corresponding to the number of cross partition forming panel members 52, also extend from and along the medial fold line 40 and are adapted to be tucked inwardly of the carton during erection or set-up thereof for engagement of the hook members 58 of the cross partition forming panel members 52 with the respective bridge portions 72 upon folding or swinging the cross partition forming panel members 46 and 48 inwardly of the carton during erection of the latter.

Each of the pick-up openings 70 are slightly elongate and are adapted to receive a pick-up cleat or finger on a carton blank feed mechanism to be described to feed carton blanks in the collapsed condition of FIGURE 14 to various instrumentalities for setting the carton blank up into an erected cellular carton. Furthermore, a pair of spaced elongate slots 74 extend between the bottom wall forming panel member 36 and the side wall forming panel member 32 across the fold line 34 joining the latter, and each is adapted to receive carton expanding finger means to be hereinafter described which are then engageable with the opposite overlying wall member of the carton blank to spread the opposite walls thereof away from each other to initially expand the carton blank for erecting purposes, such an initially expanded carton blank being illustrated in FIGURE 13.

As is clearly illustrated in FIGURE 14, in its collapsed or knocked-down condition, the carton blank 20 is partially folded upon itself along the medial fold line 40 at one end thereof and again at the medial fold line 50 to permit securing the terminal glue strip 64 to the side wall forming member 32. As a result, the respective side, bottom and top wall forming panel members including the cross partition forming panel members aforementioned overlie each other and form one end thereof through somewhat more than one-half of its length, the cover forming panel member 28 and locking panel or strip 22 being, therefore, of single ply. A plurality of collapsed cartons as illustrated in FIGURE 14 are adapted to be stacked one upon the other in a supply magazine with the cover forming panel member and the panel members connected thereto lying on the bottom, and the edge of the carton blank at the medial fold line 40 forming the leading edge of a carton blank fed from the magazine.

Referring now particularly to FIGURES 1 through 5, the drawings illustrate an apparatus comprising a supporting frame indicated generally at 76 and which includes four spaced, vertically disposed corner frame members or posts 78. The corner frame members or posts at one end of the supporting frame are interconnected by vertically spaced end rails 80 and 82, while a single end rail 84 interconnects such members or posts 78 at the other end of the supporting frame and opposite the end rail 82. A pair of side rails 86 extend between and interconnect the upper ends of the corner frame members or posts at each end of the supporting frame, while a cross frame member 88 is connected between side rails 86 between the ends of the latter. Finally, the end rails 82 and 84 are connected by a pair of frame members 90.

A supply magazine for a stack of carton blanks in the collapsed condition of FIGURE 14 is indicated generally at 92, and comprises the rectangularly spaced end and inner angle members 94 and 96, respectively, suitably rigidly secured to and upstanding from a pair of support plates 98 extending between and having their opposite ends suitably secured to the end rail 80 and the cross frame member 88. A plurality of laterally spaced elongate magazine bed or floor plates 100 are likewise suitably secured to the end rail 80 and the cross frame member 88 between the support plates 100 at the lower ends of the magazine angle members 94 and 96 so as to form a floor for the stack of carton blanks contained within the magazine. A teeter plate 102, as shown particularly in FIGURES 1, 2 and 5, extends between the magazine end angle members 94 and has its central portion suitably pivotally connected at 104 (FIGURE 5) whereby, with the magazine loaded with carton blanks, the teeter plate will tip clockwise in the aforementioned figures of the drawings to provide an inclined ramp for directing the lowermost carton blank in the magazine toward a feeding mechanism to be described.

Figure 2:
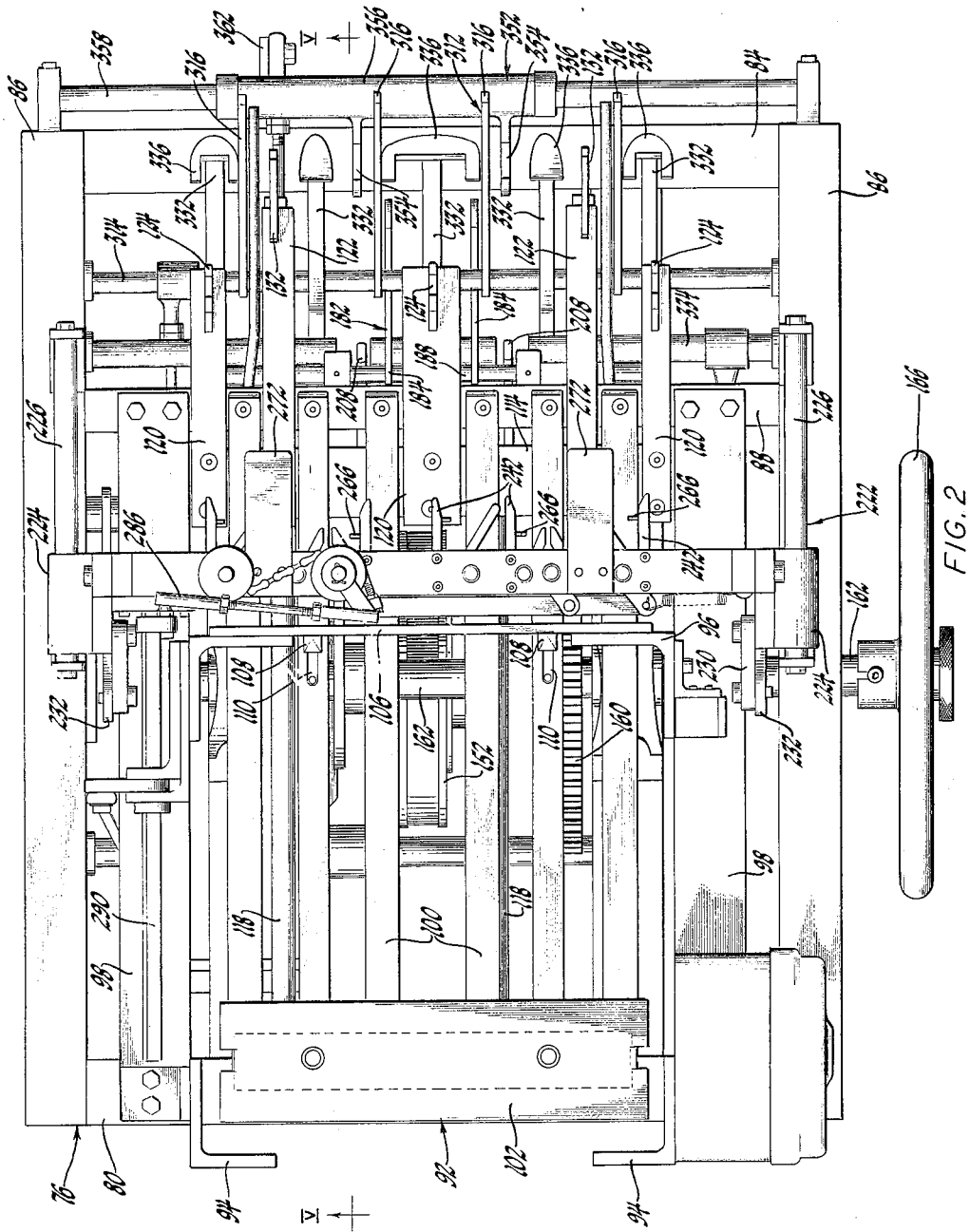
FIGURE 2 is a top plan view of the apparatus of FIGURE 1, but with the set-up head in another extreme position remote from the set-up zone and adjacent the supply magazine of the apparatus.

A mounting plate 106 extends between and connects the magazine inner angle members 96. Referring primarily to FIGURES 2 and 5, a suitable number, in this case two, of vertically extending rigid guide or metering bars 108 are secured preferably adjustably so to one side of the mounting plate within the magazine, and each includes a lower end extending beneath the bottom edge of the mounting plate in predetermined adjustable spaced relation to cooperating ones of the magazine bed or floor plates 100 opposite wavy-type metering spring 110 suitably secured to the latter. The cooperation between the respective guide or metering bars 108 and the corresponding metering springs 110 is such as to meter the lowermost carton blank in the stack thereof in the magazine from the latter beneath the mounting plate 106 irrespective of any variation, as slight as it might be, in the thickness of successive carton blanks. A suitable number of spaced spring fingers 112 are secured in spaced relation to the other side of the mounting plate 106, and the free ends thereof are adapted to wipingly engage a carton blank being fed from the magazine so as to hold it on the feeding mechanism to be described.

Referring now particularly to FIGURES 2, 5 and 15, the carton blank feeding mechanism comprises a transversely extending relatively narrow elongate feed plate 114 underlying the respective bed or floor plates 100 and having fixed thereto and depending therefrom a suitable guide bushing or bracket 116 having bores therethrough slidably receiving respective ones of a pair of laterally spaced guide rods 118 extending between and having their opposite ends respectively rigidly secured to the end rail 80 and cross frame member 88. One end of each of a plurality of feed bars 120, in this case three thereof corresponding to the number of pick-up openings 70 in the carton blank 20, and a suitable number of spaced ejecting bars 122, in this case two in number, are rigidly secured to the feed plate 114 so as to extend therefrom with the respective feed and ejecting bars being alternately positioned between respective pairs of the bed or floor plates of the magazine, while the ejecting bars extend beyond the feed plate 114 a distance considerably greater than the feed bars.

Referring additionally to FIGURES 16 and 17, a pick-up cleat or finger 124 is suitably hingedly mounted as indicated at 126 to the leading edge of the respective feed bars 120, a yieldable wavy-type spring 128 being suitably secured to the underside of each feed bar and engaging each pick-up cleat or finger remote from its hinged connection to normally bias such pick-up cleat or finger to the position illustrated in FIGURE 16, such springs being yieldable to permit retracting or downward or counter-clockwise movement of such cleat or finger in FIGURE 16. Each such pick-up cleat or finger includes a notched abutment means 130 adapted to be received within each of the pick-up openings 70 in the carton blank 20 as it rests upon the magazine bed or floor plates 100, it being understood that such pick-up cleats or fingers extend upwardly beyond the plane of such bed or floor plates.

In similar fashion, and referring adidtionally to FIGURES 18 and 19, an ejecting cleat 132 is suitably hingedly mounted as indicated at 134 to the forward end of each of the respective ejecting bars 122, another yieldable wavy-type spring 136 being secured to the underside of each of the ejecting bars and engaging its associated ejecting cleat to normally maintain the latter in the position of FIGURE 19 while permitting yieldable movement thereof clockwise in such figures of the drawings. Each such ejecting cleat further includes a notched abutment means 138 for engagement with a portion of the locking panel or strip 22 of a fully erected carton to eject the latter from the supporting frame 76 as the feed plate 114 advance a successive carton blank for set-up as will be described hereinafter.

Referring now particularly to FIGURES 1 through 5 and a description of the main drive mechanism for the various instrumentalities of the apparatus, there is provided a suitable motor, herein shown to be in the form of an electric motor 140, suitably supported on a hanger plate 142 adjustably pivotally connected to the supporting frame at 144. Preferably, this motor mount includes an adjustable hanger means 146 extending between and connecting the hanger plate 142 and the lower flange of one of a pair of mounting plates 148 which are respectively secured to and depend from the frame members 90. The output shaft of the motor is secured to a pulley drivingly connected by belt 150 to a pulley 152 suitably rigidly secured to the main drive shaft 154 having its opposite ends suitably rotatably supported as by the bearing members 156 on the respective mounting plates 148. A drive pinion 158 is likewise suitably secured on the main drive shaft 154 and meshingly engages with a larger bull gear 160 fixed on a main cam shaft 162 so as to rotatably drive the latter, such cam shaft being suitably rotatably supported on the supporting frame by the bearing members 164. A fly wheel 166 is provided on one end of the main cam shaft 162 as illustrated particularly in FIGURES 2 and 4, and can also be used to operate the apparatus manually. Thus, as long as the motor 140 continues to operate, drive is transmitted to the main drive shaft 154 and, through the gears 158 and 160 to the main cam shaft 162 which, as will be described hereinafter, is provided with a plurality of drive cams for controlling operation of various instrumentalities of the apparatus in predetermined time relationship.

In order to reciprocably drive the feed plate 114, and referring particularly to FIGURES 1, 3, 4 and 5, a drive arm 168 has one end thereof pivotally connected to one end of link 170 having its other end pivotally connected to a bracket 172 fixed to guide bushing or bracket 116, while the other end of the drive arm is suitably rigidly secured to a drive shaft 174 rotatably mounted on and extending between the mounting plates 148. A drive lever 176 is also secured to the drive shaft 174 at one end of the latter, and has one end thereof pivotally connected through the adjustable drive rod 178 to a portion of one of a pair of set-up head drive cams 180, one of which is located on and rigidly secured to opposite ends of the main cam shaft 162. Thus, as the main cam shaft rotates through 360°, the drive rod 178 and lever 176 alternately drive the drive arm 168 to and fro in a reciprocating feeding action from beneath the bed or floor plates 100 of the magazine or from the position illustrated in FIGURES 1 and 3 to the full feeding position of FIGURES 2 and 5.

From the foregoing description, it should now be readily apparent that a stack of carton blanks 20 in their collapsed or knocked-down condition is mounted within the supply magazine 92 as previously described and the feed mechanism including particularly the feed plate 114 having the feed bars 120 mounting the pick-up cleats or fingers 124 thereon is repeatedly reciprocated rectilinearly from beneath the magazine bed or floor plates 100 to supply the lowermost carton blank from the stack one at a time to other instrumentalities of the set-up apparatus at a set-up zone to be described. As carton blanks are so fed, and irrespective of variation in thickness thereof, they are metered beneath the monuting plate 106 due to the coaction of the guide or metering bars 108 with their associated yieldable metering spring 110, thereby insuring that only one carton blank is metered from the magazine at any one time notwithstanding the fact that a succeeding carton blank may be thinner or thicker than a preceding one.

Figure 4:
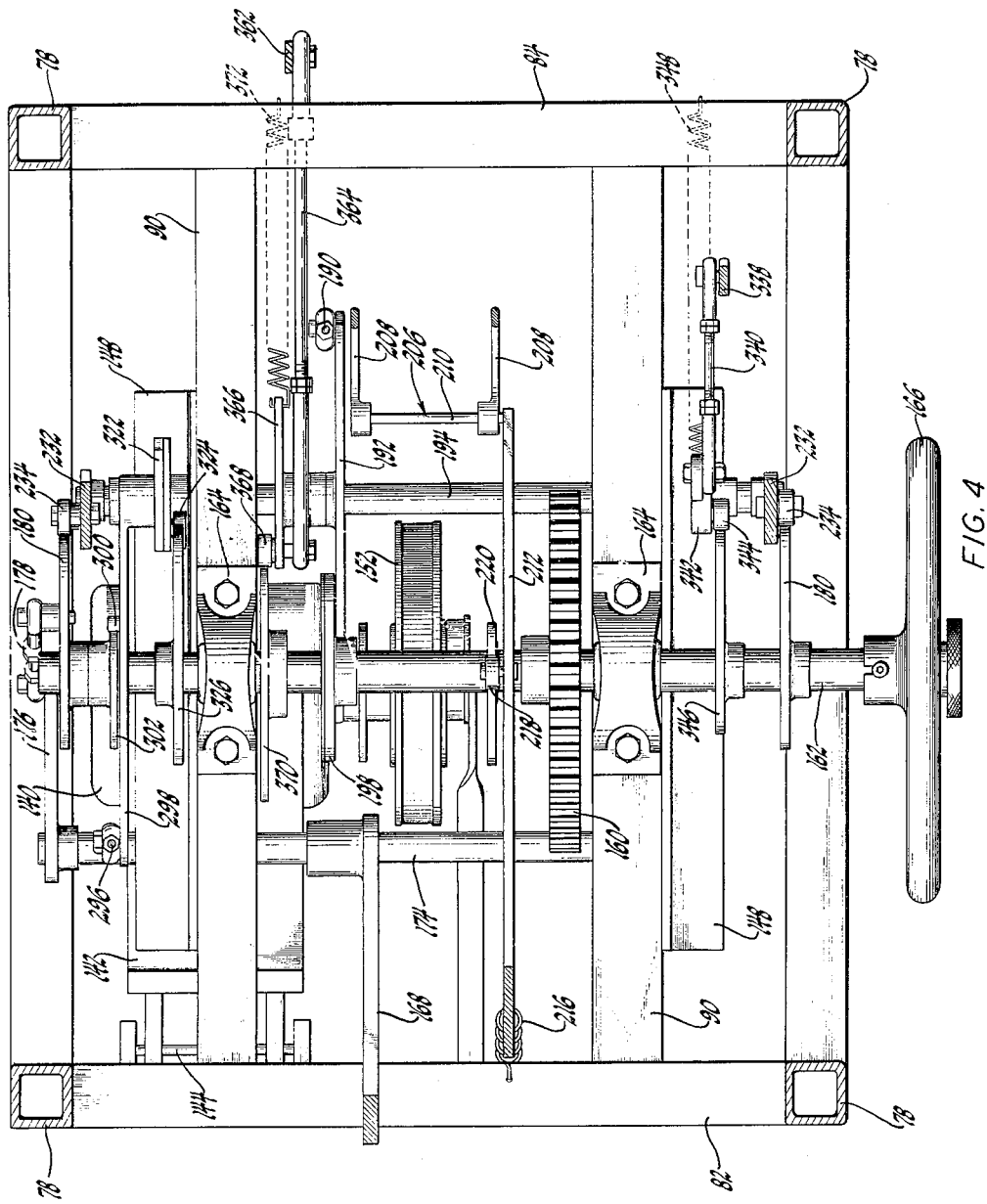
FIGURE 4 is a sectional view taken on line IV—IV of FIGURE 1 with certain parts broken away, eliminated or shown fragmentarily so as not to obscure certain details of the invention.

Referring now particularly to FIGURES 2, 4 and 5, after a collapsed carton blank has been fed into the set-up zone on the supporting frame 76, the leading or feeding edge thereof is adapted to be engaged by an oscillatable hold-down finger assembly indicated generally at 182 in FIGURES 2 and 5. This assembly comprises a pair of spaced curved fingers 184 each having a hook portion 186 at one end thereof and having the other ends thereof suitably secured to a shaft 188 suitably oscillatably mounted on the supporting frame and suitably pivotally connected to a drive rod 190, the other end of which is pivotally connected to a drive lever 192 suitably mounted for oscillation about a fixed shaft 194 extending between and having its opposite ends secured to the frame members 90. The drive lever 192 mounts a cam follower roller 196 which engages a hold-down drive cam 198 fixedly secured on the main cam shaft 162 for rotation with the latter. A spring 200 extends between and has its opposite ends connected to the drive lever 192 and a lever arm 202 fixed to a shaft 204 extending between and suitably rotatably supported on the mounting plates 148 for a purpose to be described hereinafter. At this juncture, however, it will be noted that the spring 200 continuously biases the cam follower roller 196 into engagement with the hold-down drive cam 198, while the spring is sufficiently weak to permit clockwise movement of the hold-down fingers in FIGURE 5 under certain circumstances to be described.

More specifically, as a collapsed or knocked-down carton blank is fed into the set-up zone of the apparatus, the hold-down drive cam 198 has been rotated in timed relation to the feed drive mechanism to dispose the hold-down fingers 184 substantially in the position of FIGURE 5 in which the hook portions 186 thereof engage the leading edge of the carton blank to hold it down on the supporting frame during a subsequent expanding operation for the carton blank as will be described. However, in the event that the magazine is loaded with carton blanks 20 which are somewhat longer in dimension between the locking panel or strip 22 and medial fold line 40 than cartons previously operated upon by the apparatus, or longer from medial fold line 40 to the pick-up openings 70, it will be apparent that the feeding action of the apparatus will ultimately dispose the leading edge of the carton blank or the edge defined by the medial fold line 40 a somewhat greater distance to the right in FIGURE 5 from the supply magazine than would be the case with such a shorter carton blank. In such an event, the hold-down fingers 184 are freely yieldable clockwise as aforedescribed to still hold down the leading edge of the carton for the purposes aforementioned, without buckling the carton within its length.

Figure 1:
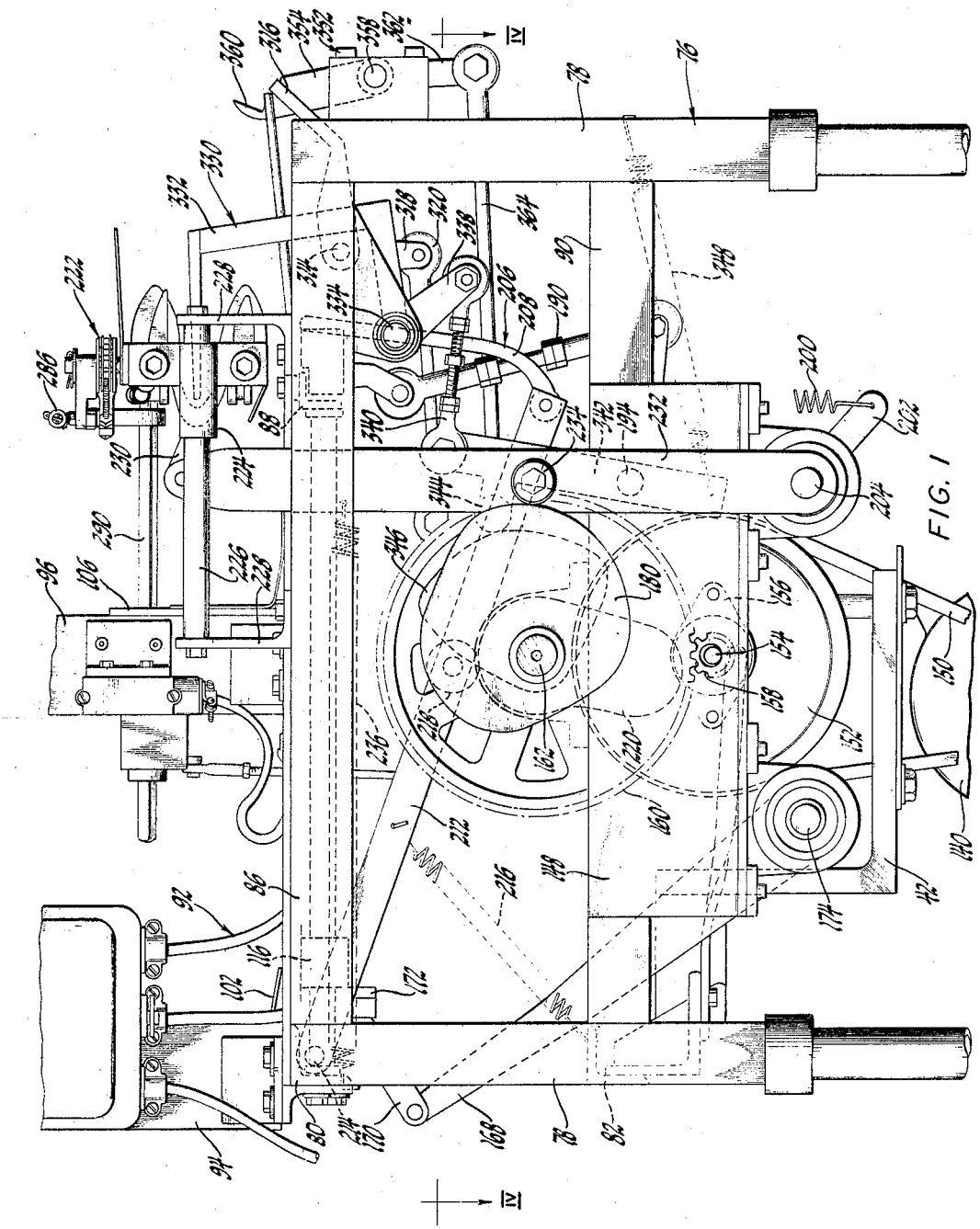

Referring now particularly to FIGURES 1 and 4, after a collapsed carton blank has been fed into the set-up zone on the supporting frame and the leading edge thereof engaged with the hold-down fingers as aforedescribed, the carton blank is adapted to be partially expanded by means of an oscillating expanding finger assembly indicated generally at 206 in FIGURES 1 and 4. This assembly comprises a pair of curved elongate expanding fingers 208 suitably secured to a shaft 210 extending from one end of an elongate drive arm 212 pivotally mounted for oscillatory movement on a shaft 214 suitably secured to the supporting frame at one top end thereof as clearly illustrated in FIGURE 1. A spring 216 extends between and has its opposite ends connected to the drive arm 212 and the end rail 82 of the supporing frame so as to continuously urge a cam follower roller 218 pivotally mounted on the drive arm into engagement with a drive cam 220 suitably rigidly secured to the main cam shaft 162. The shape of the drive cam 220 is such as to alternately raise and lower or oscillate the fingers 208 from a lowered position as shown in FIGURE 1 to a raised position above the top of the supporting frame in timed relation with the feed mechanism, so that these expanding fingers are received through the elongate slots 74 in the bottom wall member of the collapsed carton blank so as to engage the opposite wall of the carton blank and move it upwardly therefrom to substantially the position illustrated in FIGURE 13 while the hold-down finger assembly 182 holds the leading edge of the carton in position. Thus, the carton blank is partially expanded and set-up, and is ready to be acted upon by other set-up instrumentalities to be described hereinafter.

Referring now particularly to FIGURES 1 through 10, a set-up head indicated generally at 222 in FIGURES 1, 2 and 6 through 10 is mounted for rectilinear reciprocation along the supporting frame 76 between one extreme position adjacent the supply magazine as illustrated in FIGURES 2 and 8, through an intermediate or first set-up position as illustrated in FIGURE 9 to a final set-up position as illustrated in FIGURES 1 and 10 by means of guide bushings 224 fixedly secured at opposite ends thereof and respectively slidably receiving guide rods 226 having their opposite ends respectively fixedly secured above the respective side rails 86 by the mounting brackets 228. A pair of drive links 230 each have one end pivotally connected to opposite ends of the set-up head adjacent the guide bushings 224 and the other ends thereof pivotally connected to respective ones of a pair of drive arms 232 extending downwardly therefrom and suitably rigidly secured to the aforementioned shaft 204 for oscillation therewith. A cam follower roller 234 is suitably pivotally mounted on each of the drive arms and engages respective ones of the aforementioned set-up head drive cams 180 fixed to the main cam shaft as aforementioned. Return spring means 236 extend between each of the set-up head drive arms and the end rail 80 of the supporting frame to continuously urge the cam follower rollers 234 into engagement with the set-up head drive cam, and to insure positive return of the set-up head to its position adjacent the magazine as illustrated in FIGURES 2 and 8 following each set-up operation.

Referring now primarily to FIGURES 6 and 7, the set-up head 222 comprises upper and lower generally U-shaped bracket members 238 and 240, respectively, adapted to be suitably rigidly secured together in opposing relationship as by fasteners secured to each end thereof to form an open rectangular head structure. A plurality of fixed folding plates or abutments 242 are suitably rigidly secured to the upper and lower bracket members 238 and 240 so as to project forwardly therefrom a predetermined distance. A plurality of pivotal folding plates or leaves 244 and 246 are respectively pivotally mounted between the bracket members 238 and 240 as by means of pivot pins 248. Each of the pivotal folding plates or leaves 244 includes an integral lug means 250 pivotally connected at 252 to an actuator bar 254 while, in similar fashion, each of the pivotal folding plates or leaves 246 also includes an integral lug means 256 pivotally connected at 258 to an actuating bar 260. A pair of springs 262 are operatively connected between the respective ends of the set-up head and the respective actuator bars 254 and 260 so as to continuously urge the actuator bars in directions to dispose the folding plates or leaves 244 and 246 in the positions shown in FIGURE 2 in which they assume a generally V-shaped configuration with each other and the fixed folding plates or abutments 242. FIGURE 2 illustrates the position of the respective folding plates 242, 244 and 246 before starting a folding operation on the cross partition wall forming panel members thereof as to be described, the notched lustrated in FIGURE 15, while FIGURES 6 and 7 illustrate the positions of such folding plates when they have been actuated to their other extreme position in which such panel members are completely folded.

Referring now particularly to FIGURES 2, 6 and 10, it is to be noted that a stop pin 266 is fixedly secured to and extends laterally from each of the fixed folding plates or abutments 242 so as to extend into cooperating openings 268 through the respective pivotal folding plates or leaves 244 and 246 when disposed in the full folding position of FIGURES 6. Thus, as the cross partition forming panel members 52 and 54 as shown in FIGURE 14 are folded out of the plane of the top wall forming panel members 46 and 48 toward the bottom wall forming panel members thereof as to be described, the notched portion 270 of each cross partition forming panel member 46 and a corresponding portion of each cross partition forming panel member 48 positively seats upon the stop pins 266 with the respective cross partition forming panel members confined between the respective cooperable pivotal folding plates or leaves and fixed folding plates or abutments as aforedescribed to positively hold such cross partition forming panel members on the set-up head during the tucking operation to be described. A pair of guide or retaining clips are secured to and extend from the upper bracket member 238 of the set-up head to facilitate guiding and holding the carton blank during the set-up operation.

Referring now particularly to FIGURES 6 and 7, the mechanism for operating the aforementioned pivotal folding plates or leaves 244 and 246 in timed relationship with movement of the set-up head and other instrumentalities of the apparatus comprises a sprocket 274 suitably rigidly secured to the pivot shaft 248 mounting one of the pivotal folding plates or leaves 244 connected to the actuator bar 254, and a second such sprocket 276 similarly rigidly connected to the pivot shaft 248 for one of the folding plates or leaves 246 connected to the actuator bar 260. A drive chain 278 has one end suitably secured to and meshingly engaging the sprocket 276 while the other end meshing engages the sprocket 274 and is adjustably connected thereto by the threaded fastener means 280. The drive arm 282 is freely pivotally mounted about the pivot shaft 248 above the sprocket 274 and cooperable with a stop pin 284 fixed to the latter, whereby rotation of the drive arm clockwise in FIGURE 6 will cause engagement thereof with the stop pin to rotate the sprocket 274 in unison therewith to transmit drive through the chain 278 to the sprocket 276, whereby the respective sprockets operate in opposite directions to reciprocate actuator bars 254 and 260 in opposite directions to fold the respective folding plates or leaves 244 and 246 in opposite directions from the V-shaped configuration of FIGURE 2. The simple connection involving the fastener means 280 permits ready adjustment of relative movement of the respective folding plates or leaves 244 and 246 relative to each other.

Figure 3:
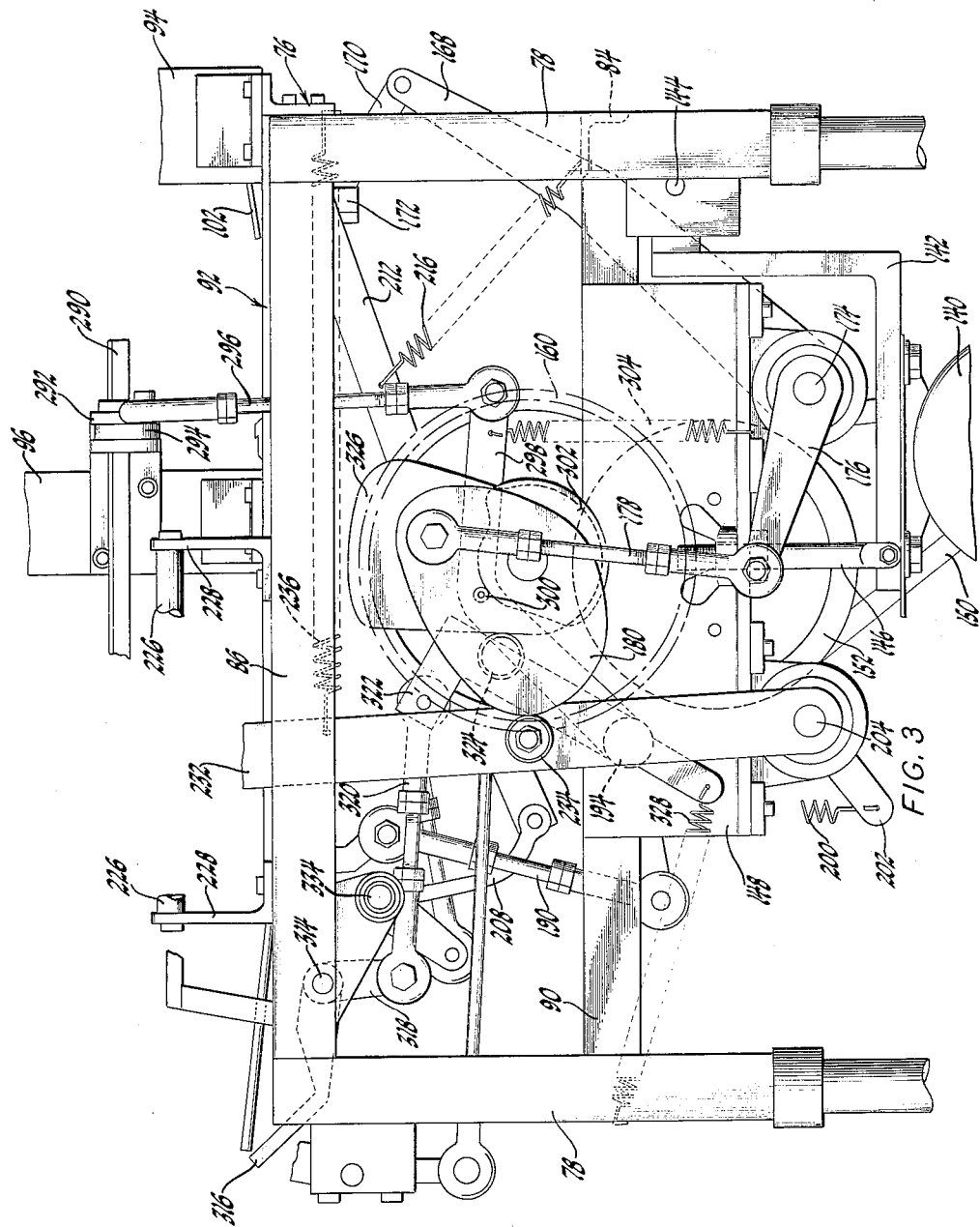
FIGURE 3 is a side elevational view corresponding generally to FIGURE 1, but taken on the side of the apparatus opposite to that shown in FIGURE 1.

Referring now additionally to FIGURES 1 to 3 and 5, the drive arm 282 is operated by means of an adjustable control link 286 having its respective ends suitably pivotally connected to the drive arm and to a crank arm 288 rigidly secured to a control rod 290 of rectangular configuration, one end of the control rod being mounted for rotation about the axis thereof on one end of the set-up head 222 and slidably extending through a suitable bearing means 292 fixed to an inner angle bracket 96 of the supply magazine as illustrated particularly in FIGURE 3. Another crank arm 294 includes a bore of suitable configuration to slidably receive the control rod 290, and is pivotally connected through a control link 296 to one end of a drive lever 298 mounted for oscillation about the shaft 194 and including a pivotal cam follower roller 300 engaging the surface of a folding plate drive cam 302 fixed to the main cam shaft for rotation with the latter. A spring 304 extends between the drive lever 298 and one of the mounting plates 148 to continuously bias the cam follower roller 300 into engagement with the surface of the folding plate drive cam 302.

At this juncture, reference will be made to FIGURES 11 through 13 showing another embodiment of the invention involving primarily slight modifications in the aforementioned set-up head and hold-down finger assembly. While these portions of the apparatus as illustrated in FIGURES 11 through 13 differ slightly structually from the corresponding components of the apparatus previously described, they function substantially identical thereto. Accordingly, like numerals primed are utilized in FIGURES 11 through 13 to illustrate parts corresponding to those previously described.

Thus, and more specifically, the hold-down finger assembly 182' comprises a pair of arcuately curved hold-down fingers 184' having hook portions 186' at one end thereof, and the other ends thereof suitably secured for oscillation on a shaft 188' pivotally connected through a drive rod 190' to one end of a drive lever 192' suitably oscillatably mounted on a shaft 194' and mounting at the other end thereof a cam follower roller 196' engaging the hold-down drive cam 198' on the main cam shaft. A spring 200' extends between the drive lever and a suitable portion of the supporting frame 76 so as to continuously urge the cam follower roller 196' into engagement with the hold-down drive cam 198', it again being noted that the spring 200' is sufficiently light to permit clockwise movement of the hold-down fingers 184' under the conditions previously described.

The set-up head 222' and its drive and including the folding plate construction and drive linkage therefore may be identical to that previously described, but differs therefrom primarily in the means for mounting the set-up head for reciprocation along the supporting frame. Thus, a depending arm 306 fixed to each end of the set-up head includes at the lower ends thereof guide rods 308 suitably slidably disposed for guided movement in guide bushings 310 suitably secured to portions of the supporting frame 76.

FIGURES 11 through 13 illustrate a successive sequence of operations in feeding a carton blank from the magazine to the set-up zone with the hook portions 186 or 186' of the hold-down fingers 184 or 184' engaging the leading edge thereof to hold it down during expansion or partial erection of the carton under the influence of the expanding finger assembly 182 as previously described, the partially expanded or erected carton being illustrated in FIGURE 13.

While the catron blank is being expanded and partially set-up as illustrated in FIGURE 13 and as aforedescribed, the set-up head 222 or 222', through its associated driving mechanism, will be in the process of being reciprocated from its one extreme position adjacent the magazine 92 as illustrated in FIGURES 2, 8 and 11 through the positions of FIGURES 12 and 13 to the aforementioned initial or first set-up position in the set-up zone as illustrated in FIGURE 9 where, due to the configuration of the respective set-up head drive cams 180, a dwell of the head occurs to maintain it substantially stationary in this position while the partially expanded carton as illustrated in FIGURE 13 is fed reversely thereto by a reverse feeder assembly now to be described.

Referring now particularly to FIGURES 1 through 4 and 9, the reverse feeder assembly indicated generally at 312 in FIGURE 2 comprises a rock shaft 314 having its opposite ends suitably oscillatably supported in depending brackets secured to each of the side rails 86. A plurality of reverse feeding fingers 316, herein shown to be four in number, each have one end thereof suitably secured to the rock shaft 314 and the other ends formed with a generally V-shaped confiiguration for engagement with the medial fold line 40 of the carton blank and the bottom wall forming panel members 36 and 38 to either side thereof as illustrated in FIGURE 9. In order to oscillate the reverse feeding fingers 316, and referring particularly to FIGURE 3, an arm 318 is fixed to the rock shaft 314 and has its free end pivotally connected to a rod 320 which is also pivotally connected to the upper end of a drive arm 322 suitably rotatably supported for oscillation on the shaft 194. A cam follower roller 324 is pivotally mounted on the drive arm 322 and engages the reverse feeder assembly drive cam 326 suitably rigidly secured to the main cam shaft 162. The other end of the drive arm is connected through a spring 328 to the end rail 82 of the supporting frame so as to continuously urge the cam follower roller into engagement with the reverse feeder assembly drive cam. It will thus become apparent that, as the main cam shaft 162 is driven rotatably, the reverse feeder assembly drive cam 326 will rotate in suitable timed relation to the other drive cams carried by the shaft to oscillate the reverse feeding fingers 316 from a position beneath the path of travel of the feed mechanism as illustrated in FIGURE 8 to the position of FIGURE 9 wherein they engage the bottom wall forming panel members 36 and 38 of the carton blank and the medial fold line therebetween to feed the partially expanded and set-up carton blank into engagement with the set-up head 222 in the intitial or first set-up position of FIGURE 9 as aforementioned, but prior to operation of the folding plates or leaves to the full open folding position as shown in FIGURE 9. During this operation, the guide or retaining clips 272 assist in guiding and retaining the carton blank relative to the set-up head.

At this time, and during the dwell period of the set-up head drive cams 180 to maintain the set-up head substantially stationary in its initial or first set-up position in the set-up zone as illustrated in FIGURE 9, the folding plate drive cam 302, operating in timed relationship to the set-up head drive cams, operates to fold the folding plates or leaves 244 and 246 as previously described dispose them in the positions of FIGURES 6, 7 and 9. As a result, the cross partition forming panel members 52 and 54 are folded inwardly of the partially erected carton and extend substantially perpendicular to the side wall forming panel members and toward the bottom wall forming panel members thereof. At this time, and as described hereinbefore, notched portions 270 of each section of each cross partition forming panel member 52 and corresponding portions of the other similar panel members 54 are positively seated on the stop pins 266 with the panel members fully laterally confined between corresponding pairs of fixed folding plates or abutments 242 and corresponding folding plates or leaves 244 and 246, thereby to prevent any dislodgment of the cross partition forming panel members from the set-up head during a subsequent tucking operation to be described.

In order to complete the final set-up or erection of the carton blank as illustrated particularly in FIGURE 10, there is provided a tucking finger assembly indicated generally at 330 in FIGURES 1 and 2 and, referring primarily to FIGURES 1, 2 and 4, comprising a plurality of bowed tucking fingers 332, herein shown to be five in number, each having one end thereof secured to a rock shaft 334 oscillatably supported between the aforementioned depending brackets secured to side rails 86 and mounting rock shaft 314. The other end of each tucking finger includes fork means 336 adapted to engage the medial fold line 40 between the bottom wall forming panel members 36 and 38 of the carton blank to reversely bend the latter into a generally V-shaped configuration while the set-up head is still in the position of FIGURE 9 and, followed by subsequent movement of the set-up head from the initial set-up position of FIGURE 9 to the final set-up position of FIGURE 10 while such tucking fingers remain substantially stationary, further reversely bending the bottom wall forming panel members of the carton into a relatively deep V-shaped configuration as illustrated in FIGURE 10 to interlock the bottom wall forming panel members with the cross partition forming panel members 52 and 54 as previously described. The rock shaft 334, and hence the tucking fingers 332, is oscillatable by means of an arm 338 having one end secured to the rock shaft and the other end connected pivotally to a rod 340 the other end of which is pivotally connected to the upper end of a drive lever 342 oscillatably mounted on the shaft 194. A rotatable cam follower roller 344 is suitably connected to the drive lever 342 and engages the tucking finger drive cam 346 fixed on the main cam shaft 162, while the spring 348 extends between the lower end of the drive lever and the supporting frame to continuously urge the cam follower roller 344 into engagement with its drive cam 346.

Thus, it may be seen that the tucking finger drive cam 346, operating in predetermined timed synchronism with the other drive cams and the instrumentalities controlled thereby and particularly the set-up head drive cams 180, operates to oscillate the tucking finger assembly 330 from a lowered position as illustrated in FIGURE 9 to a fully raised position as illustrated in FIGURES 1 and 10 to reversely bend the bottom wall forming members of the carton along the medial fold line 40 and move them toward the set-up head 222 in the initial set-up position of FIGURE 9. The contour of tucking fingers drive cam is such relative to the contour of the set-up head drive cams that the latter finish their dwell cycles to again move the set-up head from the initial set-up position of FIGURE 9 to the final set-up position of FIGURE 10 while the tucking finger assembly in retained stationary in its fully raised position as illustrated in FIGURE 10. As the set-up head moves to the final set-up position, the respective cooperable locking portions on the cross partition forming panel members 52 and 54 and the bottom wall forming panel members as previously described interlockingly engage to form a finally set-up or erected carton.

As a collapsed or knocked-down carton blank is being fed from the supply magazine toward the set-up zone in the apparatus, the set-up head 222 reciprocates from its final set-up position in the set-up zone as illustrated in FIGURE 10 toward the magazine, and a preceding carton blank which has been fully set-up as aforedescribed is ejected from the apparatus away from the magazine onto a well known delivery chute, not shown. Thus, as the set-up head so moves, the feed plate 114 is advancing along the supporting frame 76 from the fully retracted position of FIGURE 1 toward the full feed position of FIGURE 2 and, during this travel of the feed plate, the notched abutment means 138 of the ejecting cleats 132 engage within the recesses adjacent locking hooks 24 along the trailing locking panel or strip 22 of the fully erected carton. An erected carton is thus ejected from the apparatus or shoved therefrom as the feed plate feeds a succeeding collapsed carton blank to the set-up zone thereof, such a fully erected carton be directed upwardly from the supporting frame onto a pair of guide rods 350 fixed to cross frame member 88 and extending upwardly and longitudinally therefrom for delivery to the delivery chute.

To further facilitate the ejecting operation onto the delivery chute, there is provided an ejecting finger assembly indicated generally at 352 in FIGURES 1, 2 and 5. Referring particularly to these figures of the drawings and also FIGURE 4, this assembly comprises a pair of eject arms 354 secured to a bushing 356 supported for oscillation on a fixed shaft 358 extending between the corner frame members 78 at the delivery end of the apparatus. The upper end of each of these fingers is provided with hook portion 360 to engage a portion of the erected carton so as to eject or throw the latter from the supporting frame 76 into the delivery chute. A drive arm 362 is secured to the bushing 356 and is pivotally connected to one end of a drive rod 364 having the other end thereof pivotally connected to the upper end of a drive lever 366 mounted for oscillation about the aforementioned shaft 194. A cam follower roller 368 is rotatably supported on the drive lever 366 and engages an ejector drive cam 370 suitably secured to the main cam shaft 162, a spring 372 being connected between the drive lever 366 and the end rail 84 to continuously urge the cam follower roller 368 into engagement with its drive cam 370. Again, the ejector drive cam 370 is so formed and operates in such timed relation with the other cam-driven instrumentalities of the apparatus so as to rotate the eject arms 354 with reference to FIGURE 5 clockwise to eject a fully erected carton from the supporting frame as the feed plate 114 feeds a succeeding carton blank to the set-up zone of the apparatus.

In view of the foregoing description of the structure and function of the individual instrumentalities of the apparatus and method hereindescribed, it should only be necessary to summarize briefly the operation of the apparatus and method of this invention in connection with the manner in which these instrumentalities cooperate in erecting a cellular paperboard carton from a carton blank suplied in a collapsed or knocked-down condition. In this regard, it will of course be appreciated that the electric motor 140 drives the main drive shaft 154, main cam shaft 162 and the various set-up instrumentalities and ejecting means in predetermined timed synchronism to be described hereinafter.

Thus, the feed mechanism including particularly the feed plate 114 is rectilinearly reciprocable from a position beneath the magazine bed or floor plates 100 toward the set-up zone on the apparatus and, in so moving, the pick-up cleats or fingers 124 are receivable within the pick-up openings 70 in a collapsed carton blank as illustrated in FIGURE 14 to advance the carton along the supporting frame. In being so advanced, the carton blanks are fed one at a time beneath the mounting plate 106 between the guide or metering bars 108 and the cooperating yieldable metering springs 110. As the feed plate advances from beneath the magazine, the hold-down finger assembly 182 or 182′ begins to rise substantially from a position of FIGURE 11 to the positions illustrated in FIGURES 5, 12 and 13 so as to engage and hold down the leading edge of the carton blank. During movement of the feed plate and hold-down finger assembly as aforedescribed, the expanding finger assembly 206 begins to rise from beneath the feed plate or from the position illustrated in FIGURE 1. Feed plate travel will ultimately discontinue and the expanding fingers 208 will enter the carton blank slots 74 so as to move the panel members 38, 44, 46 and 48 upwardly as illustrated in FIGURE 13. Preferably just slightly prior to the carton expanding fingers reaching their upward limit of travel as aforedescribed, the reverse feeder assembly 312 begins to move from beneath the supporting frame toward its extreme raised position as illustrated in FIGURE 9. Further upward movement of the carton expanding fingers then discontinues entirely, and the reverse feeding fingers 316 are rotated up into position while the hold-down finger assembly is retracted.

In so moving, the medial fold line 40 between the bottom wall forming panel members 36 and 38 of the carton blank cams up the inclined surface at the free end of the reverse feeding fingers until the base of the carton blank sits in the V-shaped notch of the feeding fingers as illustrated in FIGURE 9. The carton expanding fingers at this time or just prior thereto will begin to lower to a point beneath the supporting frame as the reverse feeding fingers move toward the set-up head 222 which is now being disposed substantially stationary in the initial set-up position in the set-up zone as illustrated in FIGURE 9 prior to operating the folding plates or leaves 244 and 246. In the FIGURE 9 position, the expanding fingers have been lowered out of the path of movement of the feed plate and the carton blank carried thereon, the reverse feeding fingers are substantially stationary and the tucking finger assembly 330 has begun to move upwardly. Just prior to or during such upward movement of the tucking finger assembly as aforementioned, the drive mechanism for the folding plates or leaves 244 and 246 is actuated to fold the cross partition forming panel members as illustrated in FIGURE 9.

As the tucking finger assembly moves from the position illustrated in FIGURE 9 to that of FIGURE 10, they will engage the medial fold line 40 on the carton blank as previously described and, between the positions illustrated in FIGURES 9 and 10, the tucking finger assembly will make a relatively shallow V-crease in the bottom wall forming panel members of the carton blank substantially at the time that the folding means have been operated to fold the cross partition forming panel members within the carton blank. The tucking finger assembly will operate to an extreme raised position as illustrated in FIGURE 10 which does not result in interlocking engagement of the cross partition forming panel members with the bottom wall forming members of the carton blank due to the position of the set-up head in its initial set-up position of FIGURE 9. However, at this time, the dwell cycle for the set-up head drive cams is completed and the set-up head is moved to the final set-up position of FIGURE 10 thereby completing the tucking operation. Upon completion of this tucking operation, the reverse feeder assembly 312 begins to rotate back to its initial position and the set-up head 222 begins to retract while the feed plate 114 is coming forward with another carton blank to be set-up. As the feed plate comes forward, the ejecting cleats thereon engage the locking panel or strip 22 of the set-up carton as previously described, and thrust it onto the guide rods 350 for cooperation with the eject arms 354 for ejectment into the delivery chute, not shown.

While but one basic form of the inventive apparatus including several embodiments of component parts thereof have been shown and described as well as but one basic manner of practicing the method of this invention, other forms will now become apparent to those skilled in the art. Therefore, it will be understood that the embodiments shown in the drawings and described above are merely for illustrative purposes, and are not intended to limit the spirit and scope of the invention.

Other modes of applying the principle of my invention may be employed instead of those explained, changes being made as regards the means and the steps hereindisclosed provided those stated by any of the following claims or their equivalent be employed.

I therefore particularly point out and distinctly claim as my invention:

1. A method for setting-up a collapsed paperboard carton blank into an erected cellular carton, said blank being of the type characterized by a connected series of panel members adapted to be erected into side wall forming members and a bottom wall forming member of an erected carton and including cross partition forming members foldable out of the plane of a top wall forming member into interlocking engagement with said bottom wall forming member; said method comprising the steps of at least partially expanding said carton blank with said top and bottom wall forming members opposite each other and connected between said side wall forming members, folding said cross partition forming members toward said bottom wall forming member, moving said bottom wall forming member toward said cross partition forming members, and holding said bottom wall forming member substantially stationary while concurrently moving said top wall forming member and said cross partition forming members toward said bottom wall forming member to interlockingly engage the latter with said cross partition forming members.

2. A method for setting-up a collapsed paperboard carton blank into an erected cellular carton, said blank being of the type characterized by a connected series of panel members adapted to be erected into side wall forming members and a bottom wall forming member of an erected carton and including cross partition forming members foldable out of the plane of a top wall forming member into interlocking engagement with said bottom wall forming member; said method comprising the steps of at least partially expanding said carton blank with said top and bottom wall forming members opposite each other and connected between said side wall forming members, holding said top wall forming member substantially stationary while folding said cross partition forming members toward said bottom wall forming member, moving said bottom wall forming member toward said cross partition forming members, and holding said bottom wall forming member substantially stationary while concurrently moving said top wall forming member and said cross partition forming members toward said bottom wall forming member to interlockingly engage the latter with said cross partition forming members.

3. A method for setting-up a collapsed paperboard carton blank into an erected cellular carton, said blank being of the type characterized by a connected series of panel members adapted to be erected into side wall forming members and a bottom wall forming member of an erected carton and including cross partition forming members foldable out of the plane of a top wall forming member into interlocking engagement with said bottom wall forming member; said method comprising the steps of moving said side wall forming members away from each other to at least partially expand said blank with said top wall forming member connected between said side wall forming members, holding said top wall forming member substantially stationary while folding said cross partition forming members toward said bottom wall forming member, moving said bottom wall forming member toward said cross partition forming members, and holding said bottom wall forming member substantially stationary while concurrently moving said top wall forming member and said cross partition forming members toward said bottom wall forming member to interlockingly engage the latter with said cross partition forming members.

4. A method for setting-up a collapsed paperboard carton blank into an erected cellular carton, said blank being of the type characterized by a connected series of panel members adapted to be erected into side wall forming members and a bottom wall forming member of an erected carton and including cross partition forming members foldable out of the plane of a top wall forming member into interlocking engagement with said bottom wall forming member; said method comprising the steps of moving said side wall forming members away from each other to at least partially expand said blank with said top wall forming member extending between said side wall forming members, engaging said top wall forming member including said cross partition forming members with a set-up head, holding said set-up head substantially stationary while folding said cross partition forming members between said side wall forming members and toward said bottom wall forming member, moving said bottom wall forming member toward said cross partition forming members, and holding said bottom wall forming members substantially stationary while concurrently moving said set-up head theretoward to interlockingly engage said cross partition forming members with said bottom wall forming member.

5. A method for setting-up a collapsed paperboard carton blank into an erected cellular carton, said blank being of the type characterized by a connected series of panel members adapted to be erected into side wall forming members and a bottom wall forming member of an erected carton and including cross partition forming members foldable out of the plane of a top wall forming member into interlocking engagement with said bottom wall forming member; said method comprising the steps of feeding a single carton blank from a stack thereof into a set-up zone, moving said side wall forming members away from each other to at least partially expand said blank with said top wall forming member extending between said side wall forming members, feeding said top wall forming member into engagement with a set-up head in said set-up zone, holding said set-up head substantially stationary while folding said cross partition forming members between said side wall forming members and toward said bottom wall forming member, moving said bottom wall forming member toward said cross partition forming members, and holding said bottom wall forming member substantially stationary while concurrently moving said set-up head theretoward to interlockingly engage said cross partition forming members with said bottom wall forming member.

6. Apparatus for setting-up a collapsed paperboard carton blank into an erected cellular carton, said blank being of the type characterized by a connected series of panel members adapted to be erected into side wall forming members and a bottom wall forming member of an erected carton and including cross partition forming members foldable out of the plane of a top wall forming member into interlocking engagement with said bottom wall forming member; said apparatus comprising a supporting frame including a set-up zone, a set-up head mounted for movement along said supporting frame to and from said set-up zone, a multiplicity of pivotally mounted folding plates mounted on said set-up head for engagement with and folding said cross partition forming members in said set-up zone, set-up head drive means for moving said set-up head to and from said set-up zone and being operable to hold said set-up head substantially stationary in a first set-up position in said set-up zone and then being subsequently operable to move said set-up head to a final set-up position in said set-up zone, means for disposing a carton blank in said set-up zone with said top wall forming member thereof in engagement with said set-up head in said first set-up position thereof, movable tucking means engageable with said bottom wall forming member to move the latter toward said set-up head in said first set-up position thereof, and drive means for said tucking means for moving the latter toward said set-up head in said first set-up position thereof and for subsequently holding said tucking means substantially stationary during movement of said set-up head from said first set-up position to said final set-up position thereof to move said cross partition forming members into interlocking engagement with said bottom wall forming member.

7. Apparatus for setting-up a collapsed paperboard carton blank into an erected cellular carton, said blank being of the type characterized by a connected series of panel members adapted to be erected into side wall forming members and a bottom wall forming member of an erected carton and including cross partition forming members foldable out of the plane of a top wall forming member into interlocking engagement with said bottom wall forming member; said apparatus comprising a supporting frame including a set-up zone, a set-up head mounted for movement along said supporting frame to and from said set-up zone, a multiplicity of pivotally mounted folding plates mounted on said set-up head for engagement with and folding said cross partition forming members in said set-up zone, set-up head drive means for moving said set-up head to and from said set-up zone and being operable to hold said set-up head substantially stationary in a first set-up position in said set-up zone during folding engagement of said folding plates with said cross partition forming members and then being subsequently operable to move said set-up head to a final set-up position in said set-up zone, means for feeding a carton blank into said set-up zone with said top wall forming member in engagement with said set-up head in said first set-up position thereof, movable tucking means engageable with said bottom wall forming member to move the latter toward said set-up head in said first set-up position thereof, and drive means for said tucking means for moving the latter toward said set-up head in said first set-up position thereof and for subsequently holding said tucking means substantially stationary during movement of said set-up head from said first set-up position to said final set-up position thereof to move said cross partition forming members into interlocking engagement with said bottom wall forming member.

8. Apparatus for setting-up a collapsed paperboard carton blank into an erected cellular carton, said blank being of the type characterized by a connected series of panel members adapted to be erected into side wall forming members and a bottom wall forming member of an erected carton and including cross partition forming members foldable out of the plane of a top wall forming member into interlocking engagement with said bottom wall forming member; said apparatus comprising a supporting frame including a set-up zone, a set-up head mounted for reciprocable movement along said supporting frame to and from said set-up zone, a multiplicity of pivotally mounted folding plates mounted on said set-up head for engagement with and folding said cross partition forming members in said set-up zone, feed means for feeding a carton blank into said set-up zone with said cross partition forming members in engagement with said set-up head, movable tucking means engageable with said bottom wall forming member to move the latter toward said set-up head, and timed drive mechanism operatively connected to said set-up head and said tucking means to move said set-up head to and hold it substantially stationary in a first set-up position in said set-up zone during operation of said folding plates to fold said cross partition forming members and then being subsequently operable after a predetermined time interval to move said set-up head to a final set-up position thereof in said set-up zone, said drive means further being operable to move said tucking means into engagement with said bottom wall forming member during said predetermined time interval and then subsequently operable to hold said tucking means substantially stationary during movement of said set-up head to said final set-up position thereof.

9. The apparatus as defined in claim 8 further comprising hold down finger means disposable in the path of a carton blank being fed by said feed means and being engageable with the leading edge thereof to hold the latter down on said supporting frame in said set-up zone, said hold down finger means being yieldably mounted to permit yieldable movement thereof away from said set-up zone in the event of feed of a carton blank into said set-up zone beyond a predetermined extent.

10. The apparatus as defined in claim 8 further comprising oscillatable hold down finger means movable upwardly into the path of a carton blank being fed by said feed means and being engageable with the leading edge thereof to hold the later down on said supporting frame in said set-up zone, and yieldable drive means for said hold down finger means permitting yieldable movement of the latter away from said set-up zone in the event of feed of a carton blank into said set-up zone beyond a predetermined extent.

11. The apparatus as defined in claim 8 wherein said set-up head further comprises stop means cooperable with respective ones of said folding plates upon folding said cross partition forming members to engage and positively hold and support the latter during movement of said set-up head to said second set-up position thereof.

12. The apparatus as defined in claim 8 wherein said set-up head further comprises a multiplicity of stop pins fixed thereto and extending through cooperable openings in respective ones of said folding plates upon folding said cross partition forming members to engage and positively hold and support the latter during movement of said set-up head to said second set-up position thereof.

13. The apparatus as defined in claim 8 further comprising first and second actuating linkage means respectively operatively interconnecting first and second groups of said folding plates for pivoting the latter, first and second drive pulleys secured for pivotal movement with first and second folding plates of said respective groups thereof, motion-transmitting means interconnecting said first and second pulleys, and folding plate drive means operatively connected to one of said pulleys to rotate the latter to operate said folding plates with said set-up head substantially stationary in said first set-up position in said set-up zone.

14. The apparatus as defined in claim 8 further comprising first and second actuating linkage means respectively operatively interconnecting first and second groups of said folding plates for pivoting the latter, first and second drive sprockets secured for pivotal movement with first and second folding plates of said respective groups thereof, chain means having spaced portions thereof drivingly engageable with said first and second sprockets, the connection of one portion of said chain means to one of said sprockets being adjustable, and folding plate drive means operatively connected to one of said sprockets to rotate the latter to operate said folding plates with said set-up head substantially stationary in said first set-up position in said set-up zone.

15. The apparatus as defined in claim 14 wherein said folding plate drive means comprises a control rod of polygonal cross section fixed to said set-up head for reciprocation therewith, said control rod being reciprocably disposed within a control lever operatively connected to said one of said sprockets to rotate the latter, and means for rotating said control rod with said set-up head substantially stationary in said first set-up position in said set-up zone.

16. Apparatus for setting-up a collapsed paperboard carton blank into an erected cellular carton, said blank being of the type characterized by a connected series of panel members adapted to be erected into side wall forming members and a bottom wall forming member of an erected carton and including cross partition forming members foldable out of the plane of a top wall forming member into interlocking engagement with said bottom wall forming member; said apparatus comprising a supporting frame including a set-up zone, a set-up head mounted for movement along said supporting frame to and from said set-up zone, a multiplicity of pivotally mounted folding plates mounted on said head for engagement with and folding said cross partition forming members in said set-up zone, means for disposing a carton blank in said set-up zone with said cross partition forming members in engagement with said set-up head, tucking means engageable with said bottom wall forming member to move the latter into interlocking engagement with said cross partition forming members, and means on said set-up head cooperable with said folding plates upon folding said cross partition forming members to engage and positively hold the latter during operation of said tucking means.

17. Apparatus for setting up a collapsed paperboard carton blank into an erected cellular carton, said blank being of the type characterized by a connected series of panel members adapted to be erected into side wall forming members and a bottom wall forming member of an erected carton and including cross partition forming members foldable out of the plane of a top wall forming member into interlocking engagement with said bottom wall forming member; said apparatus comprising a supporting frame including a set-up zone, a set-up head mounted for movement along said supporting frame to and from said set-up zone, a multiplicity of pivotally mounting folding plates mounted on said head for engagement with and folding said cross partition forming members in said set-up zone, means for disposing a carton blank in said set-up zone with said cross partition forming members in engagement with said set-up head, tucking means engageable with said bottom wall forming member to move the latter into a final set-up position interlocking with said cross partition forming members, and a multiplicity of stop means fixed to said set-up head and extending toward respective ones of said folding plates upon folding said cross partition forming members to engage and positively hold and support the latter during tucking of said cross partition forming members into interlocking engagement with said bottom wall forming member.

18. Apparatus for setting up a collapsed paperboard carton blank into an erected cellular carton, said blank being of the type characterized by a connected series of panel members adapted to be erected into side wall forming members and a bottom wall forming member of an erected carton and including cross partition forming members foldable out of the plane of a top wall forming member into interlocking engagement with said bottom wall forming member; said apparatus comprising a supporting frame including a set-up zone, a set-up head mounted for movement along said supporting frame to and from said set-up zone, a multiplicity of pivotally mounting folding plates mounted on said head for engagement with and folding said cross partition forming members in said set-up zone, means for disposing a carton blank in said set-up zone with said cross partition forming members in engagement with said set-up head, tucking means engageable with said bottom wall forming member to move the latter into a final set-up position interlocking with said cross partition forming members, and a multiplicity of stop pins fixed to said set-up head and extending through cooperable openings in respective ones of said folding plates upon folding said cross partition forming members to engage and positively hold and support the latter during tucking of said cross partition forming members into interlocking engagement with said bottom wall forming member.

References Cited by the Examiner

UNITED STATES PATENTS

| | | | |
|---|---|---|---|
| 2,700,922 | 2/55 | Jordan | 93—37 |
| 2,826,409 | 3/58 | Gentry | 271—44 |
| 2,832,592 | 4/58 | Kucklinsky et al. | 271—44 |
| 2,843,026 | 7/58 | Burger | 93—37 |
| 2,950,657 | 8/60 | Margetts | 93—37 |

FRANK E. BAILEY, *Primary Examiner.*

BERNARD STICKNEY, *Examiner.*